(12) United States Patent
Chu

(10) Patent No.: US 8,214,308 B2
(45) Date of Patent: Jul. 3, 2012

(54) COMPUTER-IMPLEMENTED SYSTEMS AND METHODS FOR UPDATING PREDICTIVE MODELS

(75) Inventor: Chengwen Robert Chu, Cary, NC (US)

(73) Assignee: SAS Institute Inc., Cary, NC (US)

( * ) Notice: Subject to any disclaimer, the term of this patent is extended or adjusted under 35 U.S.C. 154(b) by 995 days.

(21) Appl. No.: 12/119,624

(22) Filed: May 13, 2008

(65) Prior Publication Data

US 2009/0106178 A1 Apr. 23, 2009

Related U.S. Application Data

(60) Provisional application No. 60/981,907, filed on Oct. 23, 2007.

(51) Int. Cl.
*G06F 15/18* (2006.01)

(52) U.S. Cl. .......................................... 706/14; 706/12

(58) Field of Classification Search ................. 706/12, 706/14

See application file for complete search history.

(56) References Cited

U.S. PATENT DOCUMENTS

| | | | |
|---|---|---|---|
| 6,430,615 | B1 | 8/2002 | Hellerstein et al. |
| 6,678,730 | B2 | 1/2004 | Hellerstein et al. |
| 6,954,758 | B1 | 10/2005 | O'Flaherty |
| 2006/0173906 | A1 * | 8/2006 | Chu et al. ..................... 707/102 |
| 2007/0226039 | A1 * | 9/2007 | Chu et al. ..................... 705/10 |
| 2007/0288414 | A1 * | 12/2007 | Barajas et al. ................ 706/46 |

OTHER PUBLICATIONS

Nath, Shyam Varan; "Champion-challenger based predictive model selection"; Mar. 2007; IEEE; Proceedings, IEEE SuthestCon, 2007; p. 254.*
Nath, Shyam V. et al.; "Customer Churn Analysis in the Wireless Industry: A Data Mining Approach"; Proceedings—Annual Meeting of the Decision Scineces Institute; 2007; pp. 1-20.*
Dreiseitl, Stephan et al.; "Logistic regression and artificial neural network classification models: a methodology review"; 2003; pp. 352-359 (1-8).*
Neslin, Scott A. et al.; "Defection Detection: Measuring and Understanding the Predictive Accuracy of Customer Churn Models"; 2006; pp. 204-211.*
Steyerberg, Ewout W. et al.; "Validation and updating of predictive logistic regression models: a study on sample size and shrinkage"; John Wiley & Sons, Ltd.; Statistics in Medicine); 2004; 23:2567-2586 (1-20).*

* cited by examiner

*Primary Examiner* — Jeffrey A Gaffin
*Assistant Examiner* — Stanley K Hill
(74) *Attorney, Agent, or Firm* — Jones Day

(57) ABSTRACT

Computer-implemented systems and methods for updating champion predictive models that operate within a production environment. A system and method can include evaluating the predictive model performance of a champion predictive model. Based upon an indication of decay of predictive model performance of the champion predictive model, a corrective action is performed to correct the performance of the champion predictive model.

23 Claims, 26 Drawing Sheets

```
libname mm_jobs 'c:\mm.test\report.auto';

data mm_jobs.project;
length testDestination $150 projectuuid $36 projectpath $200 precode $32000 isActive $1 notes
       $500;
length projectAlias $50;
isActive='Y';
testDestination="c:\mm.test\report.test.output\project_123";
projectuuid="41022092-ac10-1419-014e-aec96aabb2b4";
precode='%let    _MM_EventProbVar=p_bad1;%let    _MM_TargetVar=bad;%let
  _MM_TargetEvent=1;%let    _MM_ReportDatasrc=scoreIn.hmeq0;%let
  _MM_KeepVars=p_bad1;%let _MM_DropVars=bad job;';
projectpath="http://xyz.com8300/ModelManager/MMRoot/Risk/Home%20Equity";
projectAlias="credit risk for younger customers";
run;

data mm_jobs.emailaddr2;
length address $50 sendAlertWarning sendJobStatus $1;
address="recipient1@mail.com";sendAlertWarning="Y";    sendJobStatus="N";output;
address="recipient2@mail.com";sendAlertWarning="Y";    sendJobStatus="Y";output;
run;
```

1100

MATCH TO FIG. 12B

Fig. 12A

MATCH TO FIG. 12A

```
data mm_jobs.reportdef;
length reportName $20 macro $1000
alertCondition $200 warningCondition $200 isActive $1 notes $500;
isActive='Y';
reportName="Characteristic";
macro='%MM_UpdateCharacteristicTable(datasrc=
     &_MM_ReportDatasrc,dropVars=%str(bad job))';
alertCondition='p1>5 or p25>0';
warningCondition='p1>2';                          ← 1110
output;

reportName="Stability";
macro='%MM_UpdateStabilityTable(datasrc=&_MM_ReportDatasrc,keepVars=
     %str(p_bad))';                               ← 1112
alertCondition='outputDeviation > 0.03';          ← 1114
warningCondition='outputDeviation > 0.01';        ← 1116
output;

reportName="Model Assessment";
macro='%MM_UpdateAssessmentTable(datasrc=&_MM_ReportDatasrc)';
alertCondition='(lift5Decay>0.15 and lift10Decay>0.12) or giniDecay>0.1 or
     ksDecay>0.1';
warningCondition='lift5Decay>0.05';
output;
```

Fig. 12B

| perfIndexBase | perfIndex | perfDecay | alertCondition | alertEval |
|---|---|---|---|---|
| | p1=4; p25=3; | | p1>5 or p25>0 | True |
| lift5=4.445;<br>lift10=4.379;<br>lift15=4.019;<br>lift20=3.683;<br>giniIndex=0.757;<br>ksStatistic=0.682; | lift5=2.690;<br>lift10=2.668;<br>lift15=2.468;<br>lift20=2.293;<br>giniIndex=0.424;<br>ksStatistic=0.383; | lift5Decay=0.395;<br>lift10Decay=0.391;<br>lift15Decay=0.386;<br>lift20Decay=0.377;<br>giniDecay=0.440;<br>ksDecay=0.438; | (lift5Decay>0.15<br>and<br>lift10Decay>0.12)<br>or giniDecay>0.1<br>or ksDecay>0.1 | True |

Fig. 13

| perfIndex | perfDecay | alertCondition | alertEval | warningCondition | warningEval |
|---|---|---|---|---|---|
| p1=0; p25=0; | | p1>5 or p25>0 | False | p1>2 | False |
| | lift5Decay=0.077; lift10Decay=0.071; lift15Decay=0.079; lift20Decay=0.070; giniDecay=0.088; ksDecay=0.077; | (lift5Decay>0.15 and lift10Decay>0.12) or giniDecay>0.1 or ksDecay>0.1 | False | lift5Decay>0.05 | True |
| lift5=4.055; lift10=4.037; lift15=3.690; lift20=3.416; giniIndex=0.689; ksStatistic=0.628; | | | | | |
| outputDeviation= 0.000; | | outputDeviation= 0.03 | False | outputDeviation > 0.01 | False |

*Fig. 20*

COMPUTER-IMPLEMENTED SYSTEMS AND METHODS FOR UPDATING PREDICTIVE MODELS

CROSS-REFERENCE TO RELATED APPLICATION

This application claims priority to and the benefit of U.S. application Ser. No. 60/981,907, (entitled "Computer-Implemented Systems And Methods For Updating Predictive Models" and filed on Oct. 23, 2007), of which the entire disclosure (including any and all figures) is incorporated herein by reference.

TECHNICAL FIELD

This document relates generally to predictive models and more particularly to computer-implemented predictive model handling systems.

BACKGROUND

Organizations today are continually increasing their use of predictive analytics to more accurately predict their business outcomes, to improve business performance, and to increase profitability. Common and yet also highly strategic predictive modeling applications include fraud detection, rate making, credit scoring, customer retention, customer lifetime value, customer attrition/churn, and marketing response models.

As the sheer number of these models increases to support more and more business objectives, so does the requirement to manage these models reliably and securely as valuable corporate assets. Many companies, especially those in the financial services sector, also need to demonstrate adherence to model validation and growing external compliance demands (e.g., governance practices outlined by the Office of the Comptroller of the Currency Administrator of National Banks (2000), the Basel II Committee's Accord Implementation Group (Basel Committee on Banking Supervision 2005), and other governing bodies). The difficulty in handling predictive models can be further exacerbated because of the greater quantity of data to be analyzed and the need to have many different types of models available to determine which models should be used to predict which portions of that large quantity of data.

SUMMARY

In accordance with the teachings provided herein, systems and methods for operation upon data processing devices are provided for updating champion predictive models that operate within a production environment. A system and method can include evaluating the predictive model performance of a champion predictive model. The evaluation of the predictive model performance includes comparing the predictive performance of the champion predictive model with respect to pre-selected predictive model performance criteria. Based upon an indication of decay of predictive model performance of the champion predictive model, a corrective action is performed to correct the performance of the champion predictive model. The action results in corrected predictions being generated within the production environment.

BRIEF DESCRIPTION OF THE DRAWINGS

FIGS. 12A-12B depict an example of code that establishes performance monitoring job parameters.

FIG. 13 depicts an example notification message.

FIG. 20 provides an illustration of a model staleness alert notification.

DETAILED DESCRIPTION

Figure 1:
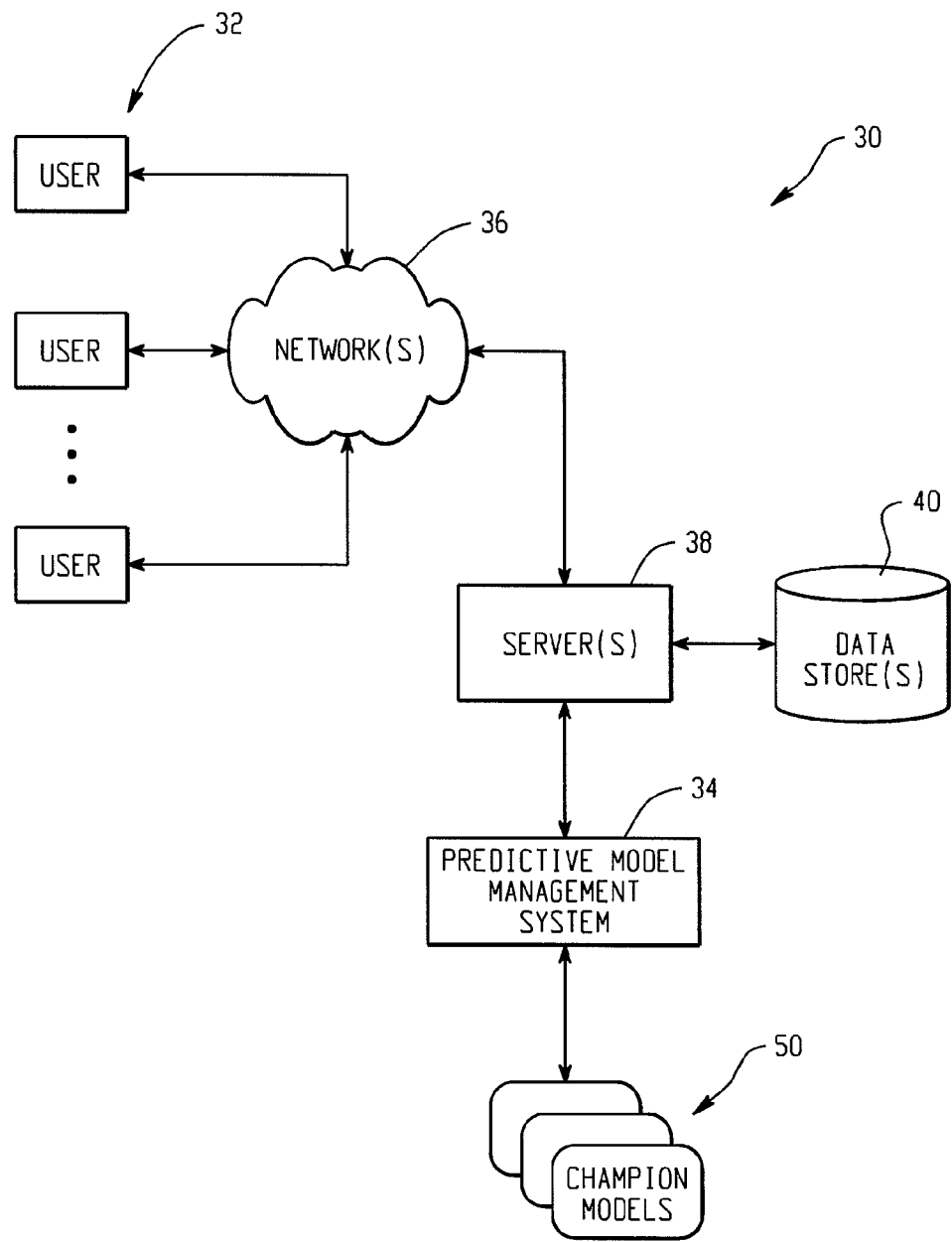
FIG. 1 is a block diagram depicting an environment wherein users can interact with a predictive model management system (e.g., a model manager system).

FIG. 1 depicts at 30 an environment wherein users 32 can interact with a system 34 to manage predictive models 50 in a production environment. Models 50 that have been deployed in a production environment (e.g., to provide real-time credit card scoring predictions to people in the field) can be termed champion predictive models. A champion predictive model is deployed for a period of time in production environments. Its predictive performance often degrades over time. A champion model may then need to be retired when its performance degradation reaches a certain threshold. The predictive model management system 34 (e.g., a model manager) can perform model monitoring tasks to identify underperforming models 50 in time to prevent problems caused by obsolete models. A champion model's degradation can be caused for many reasons, such as when the customer base has evolved sufficiently to require new sample data, or the factors that contribute to predictability have changed. The system 34 could also be configured to facilitate the transporting of the executable form of the model to an operational platform, running model performance reports, distributing the generated reports, and revalidating the model.

The users 32 can interact with the system 34 through a number of ways, such as over one or more networks 36. Server(s) 38 accessible through the network(s) 36 can host the system 34. One or more data stores 40 can store the data to be analyzed by the system 34 as well as any intermediate or final data generated by the system 34. The system 34 can be an integrated web-based reporting and analysis tool that provides users flexibility and functionality for performing model management tasks. It should be understood that the system 34 could also be provided on a stand-alone computer for access by a user.

Figure 2:
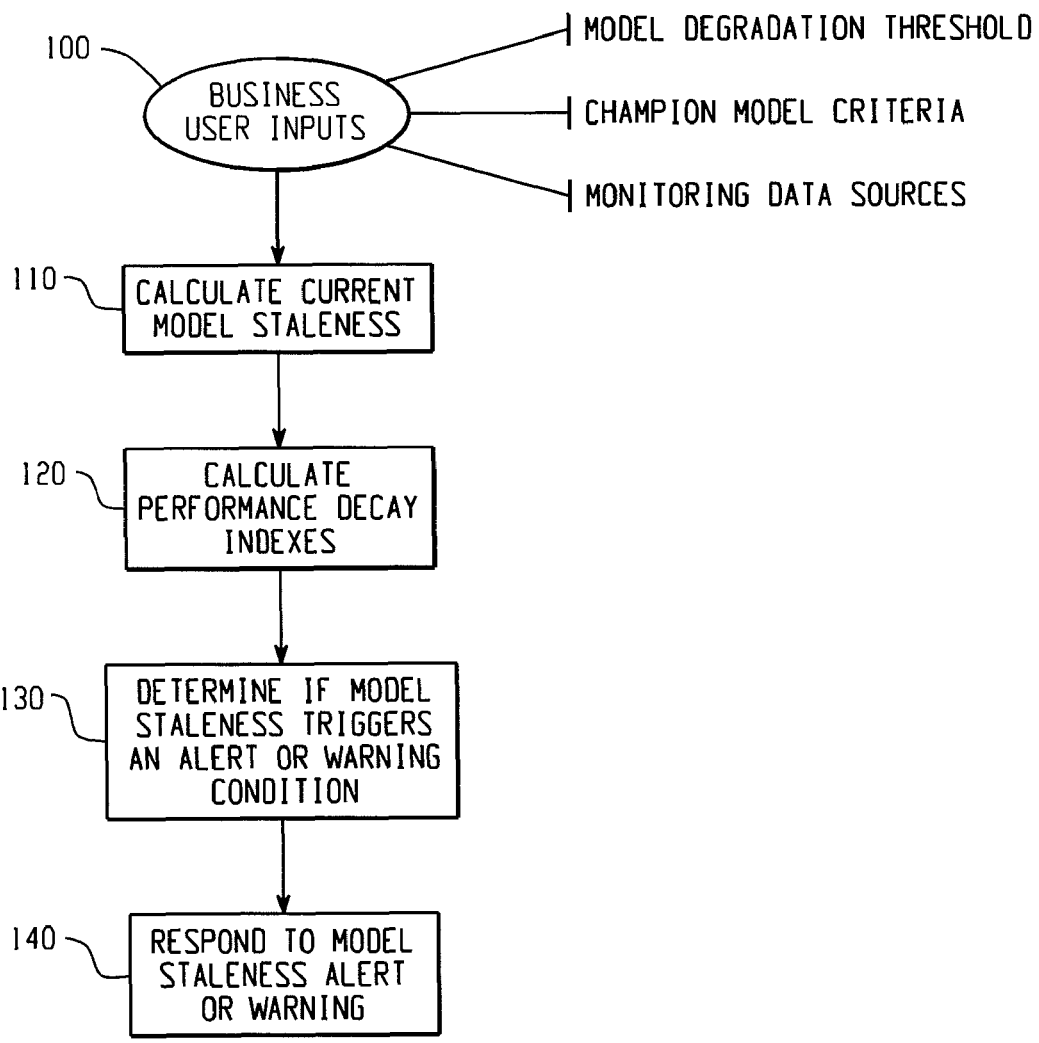
FIG. 2 is a flowchart illustrating an operational scenario for performing model management functions.

FIG. 2 illustrates an operational scenario for performing model management functions. Process 110 calculates a current champion model's staleness based upon one or more inputs. The inputs into process 110 can include certain business user inputs, such as a model degradation threshold, champion model criteria, and one or more monitoring data sources. To determine whether a current champion model is stale (i.e., performance has degraded), process 120 calculates performance decay indexes based upon data received from the monitoring data sources. Process 130 then determines if a champion model is stale by comparing the calculated performance decay indexes against a model degradation threshold. If the degradation threshold has been reached, then process 140 generates a notification, such as an alert or warning. The response to the alert or warning can be to reiterate the model generation process by developing competing candidate models and replacing the current champion model if a competing model surpasses the current champion model with respect to the champion model performance criteria.

Figure 3:
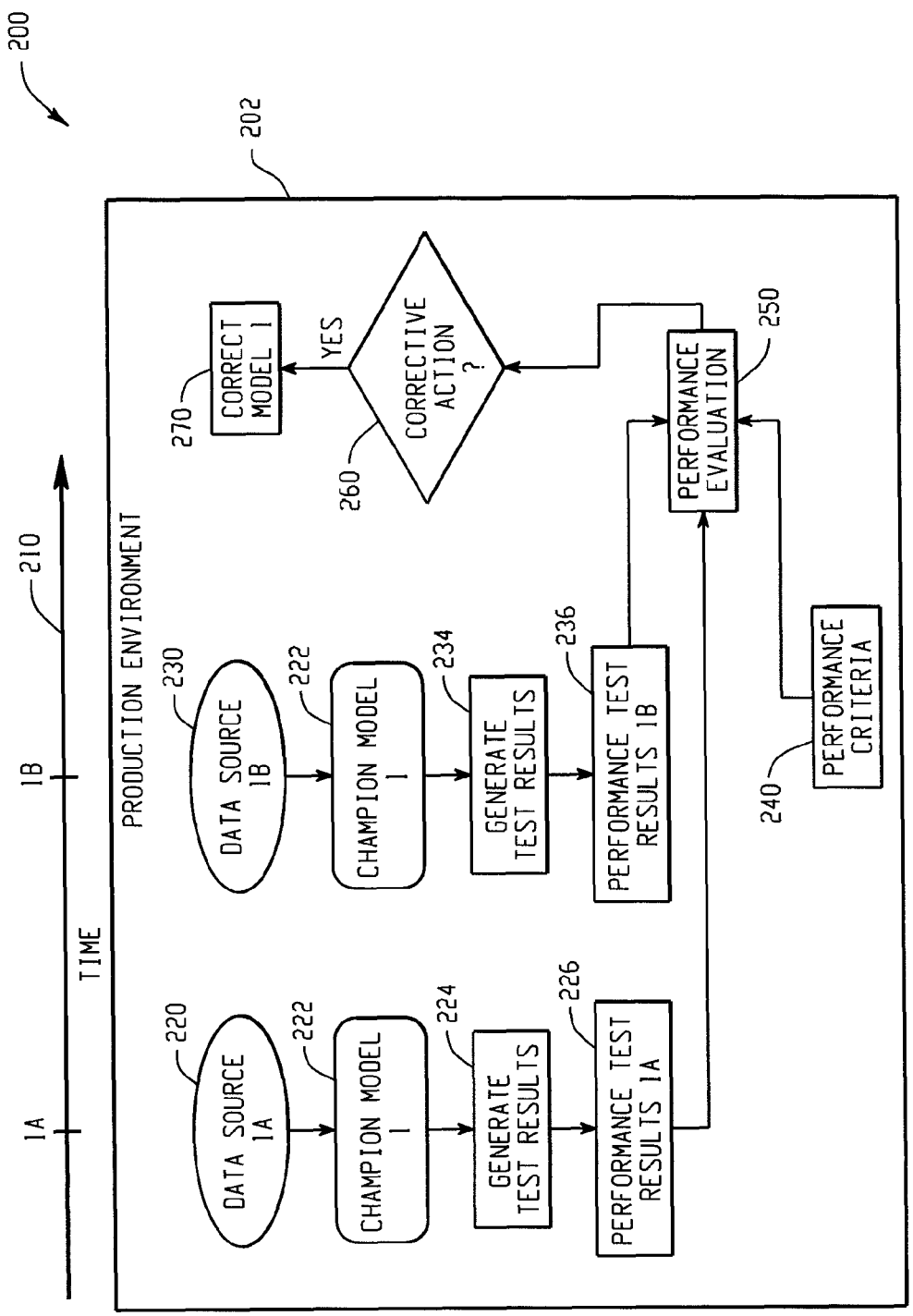
FIGS. 3-8 are block diagrams depicting operational scenarios for determining whether corrective actions are needed for a champion predictive model.

FIG. 3 illustrates another operational scenario at 200 wherein a model manager is configured to detect that a predictive model 222 has degraded over time 210 and a new model is needed. The evaluation of the predictive model's performance includes evaluating performance of the predictive model 222 over time 210 using one or more performance evaluation criteria 240 that have been standardized across multiple different model types in order to assess the predictive model's predictive performance.

For example, diminished predictive model performance can be discerned when a predictive model performance decay metric indicates that model performance has degraded beyond a first user-defined threshold. Additionally, the standardized performance evaluation criteria can indicate diminished model performance when input or output variable distribution shift beyond a specified level. Further, the standardized performance evaluation criteria can include a plurality of predictive model performance decay metrics that are based upon data collected at different points in time with respect to a predictive model, wherein the predictive model decay metrics are selected from the group consisting of lift5decay, lift10decay, ginidecay, ksdecay, p1, p25, and combinations thereof. This can help since typically many active production models and previous approaches did not provide performance indexes for organizations to use for establishing common performance degradation thresholds. Accordingly, a set of common performance indexes can be used to set performance index degradation thresholds for predictive models. When these indexes are used in model management environments, obsolete predictive models can be identified and corrected.

In this operational scenario, the standardized performance evaluation criteria 240 include a predictive model performance decay metric that is based upon data collected at different points in time (e.g., points 1A and 1B on timeline 210) and which the predictive model uses to generate its predictions. At point 1A in time on the timeline 210, the champion model 222 generates at 224 test results 226 based upon data collected from data source 1A 220 (e.g., data collected from data source 220 at time point 1A). At point 1B in time on the timeline 210, the champion model 222 generates at 234 test results 236 based upon data collected from data source 1B 230 (e.g., data collected from data source 230 at time point 1A).

The test results 226 and 236 are evaluated at 250 based upon a comparison of the test results 226 and 236 with respect to the performance criteria 240. The performance evaluation process 250 includes a determination at 260 as to whether performance of the champion model 222 has degraded to a particular degree so as to require a corrective action 270. Corrective actions can include building a first replacement predictive model to replace the original champion model 222 in order to improve performance of predictions within the production environment 202. The replacement predictive model may then be recalibrated using new data. The replacement predictive model and recalibration could be performed automatically, semi-automatically, or manually.

The corrective action could also include sending a notification to interested parties (e.g., model builders, etc.), and may include initiating a second corrective action when the standardized performance evaluation criteria indicates further diminished first model performance. For example, the second corrective action may be initiated wherein a predictive model performance decay metric indicates that model performance has degraded beyond a second user-defined threshold. The first corrective action could trigger a warning condition and the second corrective action could trigger an alert condition. A system could repeat the evaluating and initializing corrective action steps for a plurality of disparate models. This could occur periodically wherein the period for reevaluating the first model performance is user-defined.

Additional features of a model manager in this operational scenario can include logging evaluation and corrective action data in a data store. This could further include providing monitoring reports showing trends in model performance based on data from the data store. Additionally, the predictive model performance decay metric may be based upon different portions of the target population of interest.

Processes for developing replacement models can be accomplished by a variety of different approaches and under different operational scenarios, such as the approaches and scenarios depicted in FIGS. 4-7.

Figure 4:
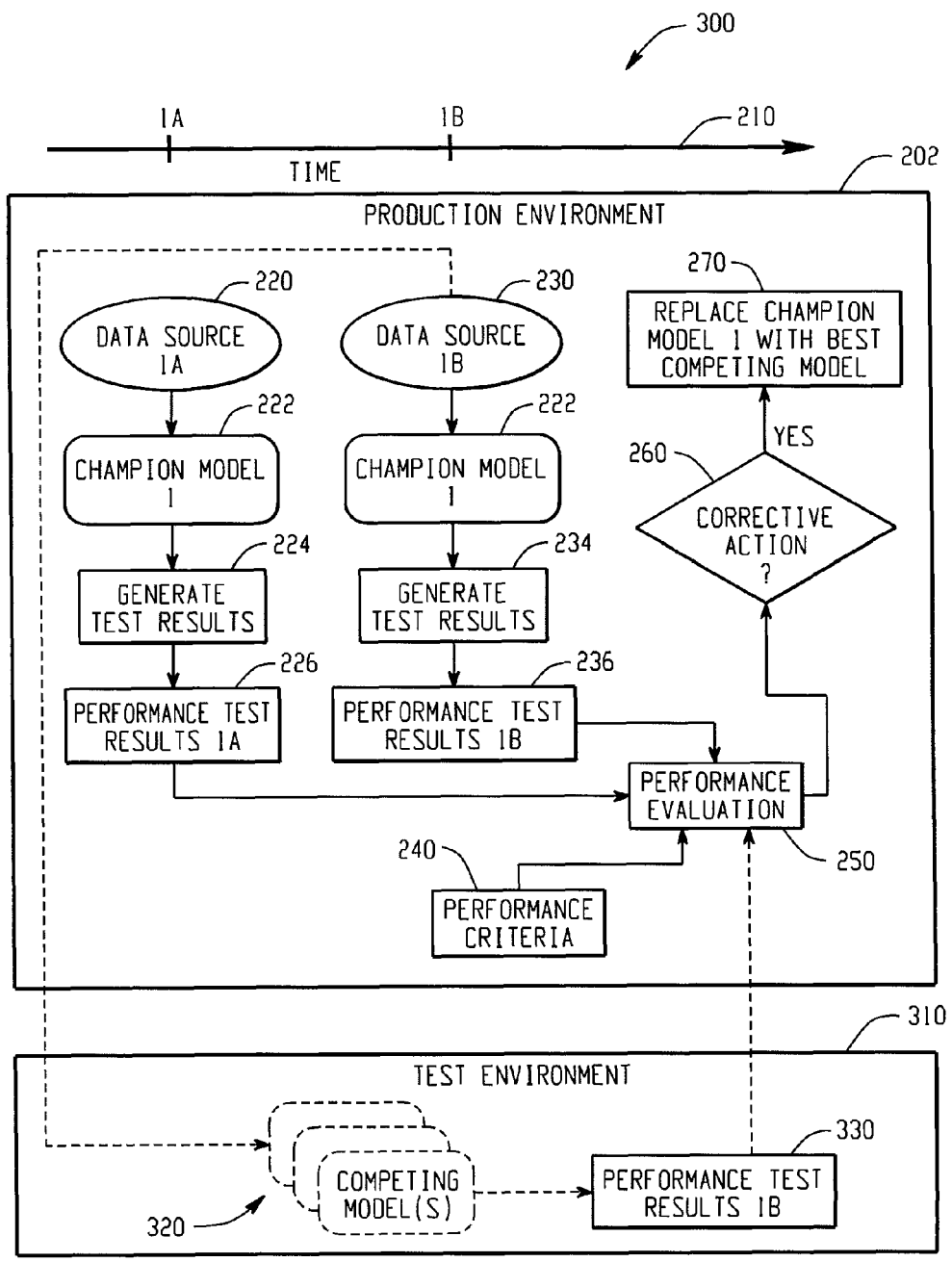

FIG. 4 depicts at 300 a production environment 202 and a test environment 310. The production environment 202 contains champion predication models to generate predictions for production purposes. The test environment 310 contains competing models 320 that are under development and which can act as replacement models for the champion models that are operating in the production environment 202. In the operational scenario of FIG. 4, the competing models 320 use data from the data source 230 collected at time point 1B to generate test results 330. A model manager compares the competing models' performance test results 330 (with respect to predicting data source 1B) with champion model 1's prediction performance 236 without using the decay indexes. Based upon the comparison, if a competing model outperforms the champion model, then a corrective action can include replacing at 270 the champion model 222 with the competing model.

Figure 5:
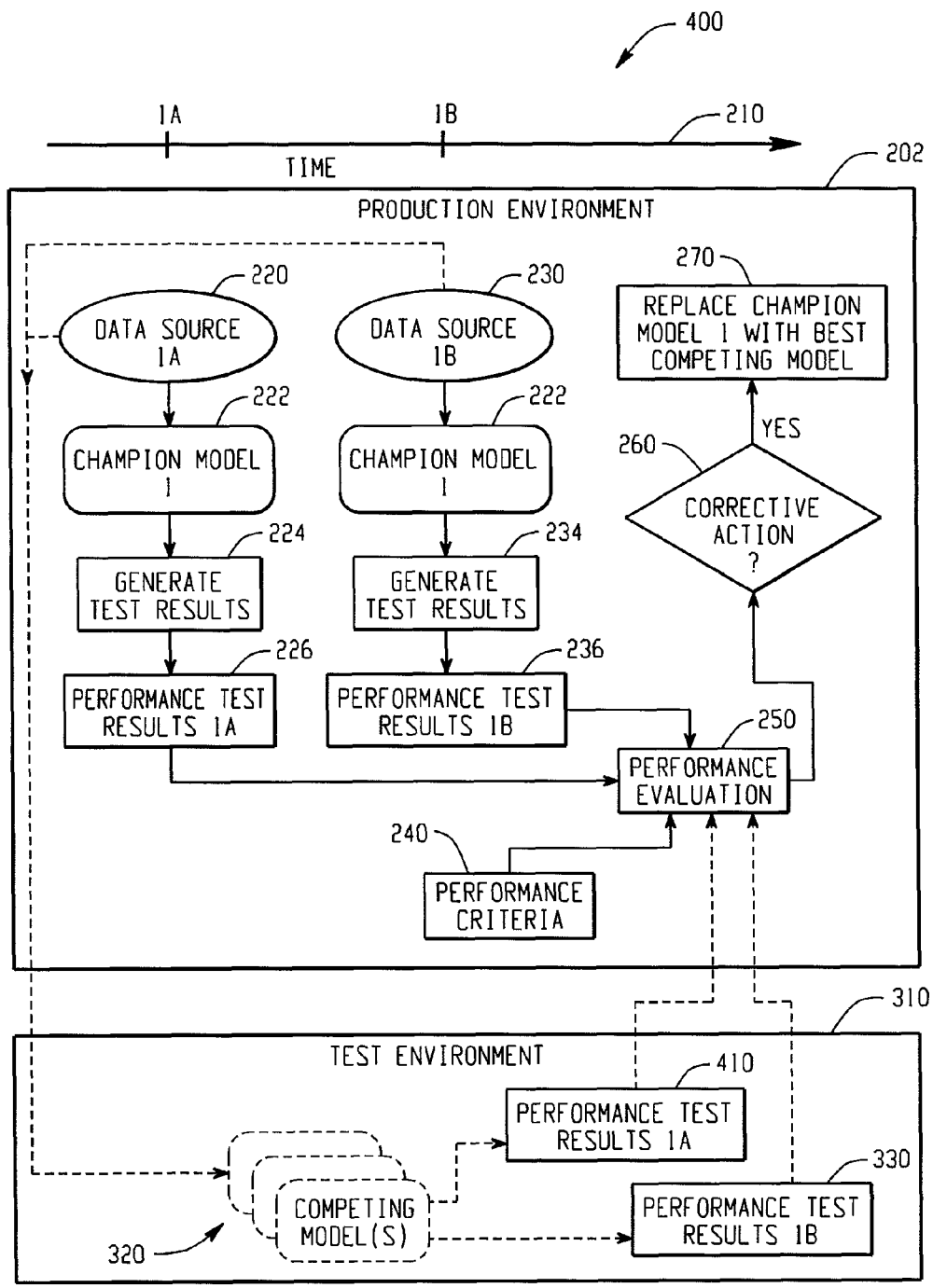

FIG. 5 depicts at 400 the test environment 310 additionally using data from data source 1A 220 so that the competing models' performance (with respect to predicting both data sources 1A and 1B) can be compared with champion model 1's prediction performance using the performance decay indexes. Based upon the comparison, if a competing model outperforms the champion model, then a corrective action can include replacing at 270 the champion model 222 with the competing model.

Figure 6:
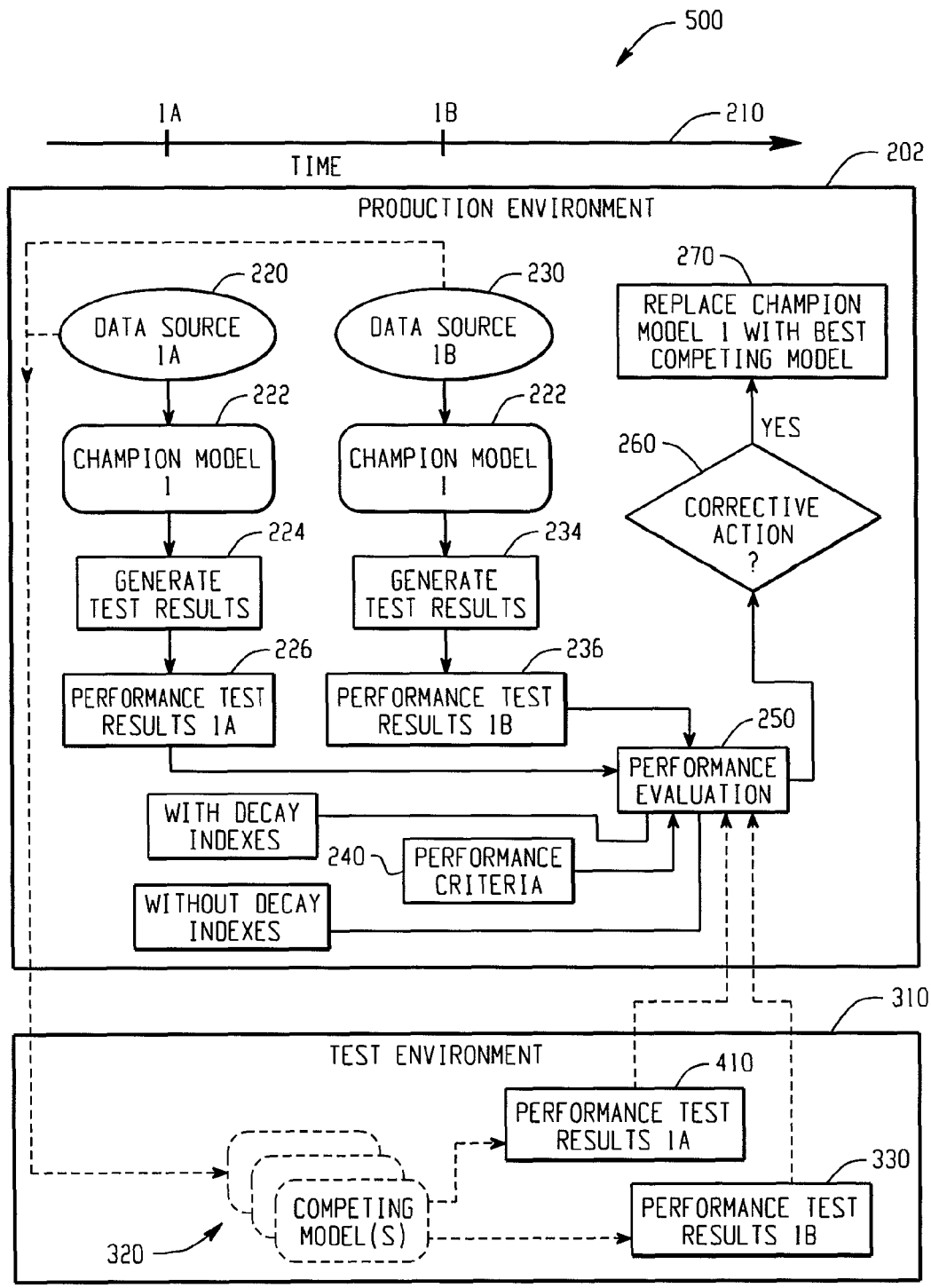

FIG. 6 depicts at 500 a model manager being configured to perform the following comparisons to determine whether a competing model is to replace the champion model:

(1) Using the decay indexes, a model manager compares the competing models' performance (with respect to predicting data from data sources 1A and 1B) with the champion model 1's prediction performance.

(2) Without using the decay indexes, the model manager compares the competing models' performance (with respect to predicting data source 1A and 1B) with the champion model 1's prediction performance.

Based upon the comparison, if a competing model outperforms the champion model, then a corrective action can include replacing at 270 the champion model 222 with the competing model.

Figure 7:
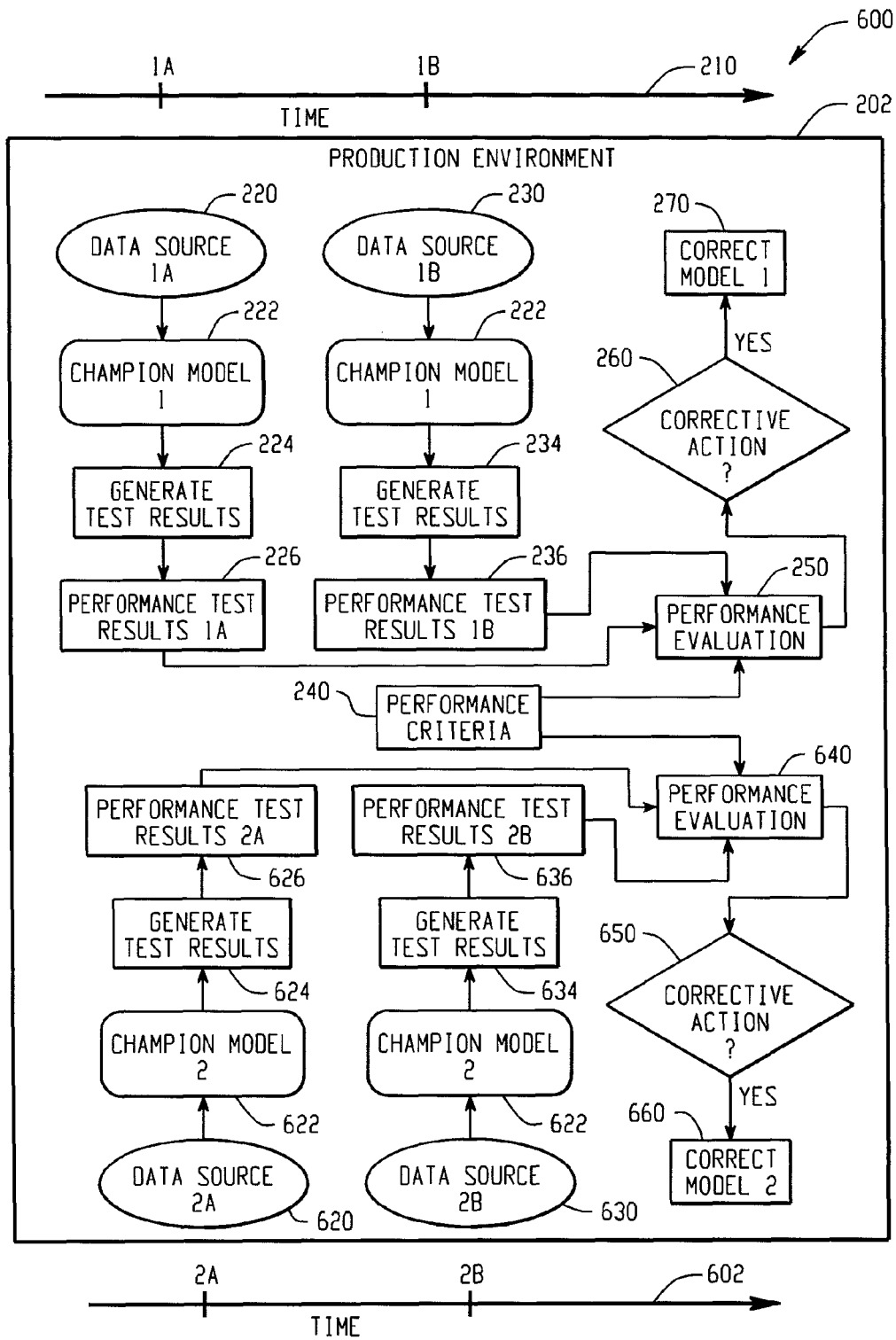

Still further as shown at 600 in FIG. 7, a plurality of different disparate types of champion predictive models' performance can be evaluated, wherein the evaluation includes evaluating performance of each predictive model (e.g., models 222 and 622) over time using the same standardized performance evaluation criteria 240 in order to assess a predictive model's predictive performance. The standardized performance evaluation criteria 240 includes a predictive model performance decay metric that is based upon data collected at different points in time with respect to a predictive model. For example, the models 222 and 622 can be evaluated at the same points in time or at different points in time. As an illustration of the latter, FIG. 7 shows model 222 generating at 224 at time point 1A test data results 226 based upon data from data source 1A 220, and generating at 234 at time point 1B test data results 236 based upon data from data source 1B 230. FIG. 7 further shows model 622 generating at 624 on time line 602 at time point 2A test data results 626 based upon data from data source 2A 620, and generating at 634 at time point 2B test data results 636 based upon data from data source 2B 630. The performance criteria 240 is used for evaluating both model 222 and model 622 and allowing any corrective action to proceed if needed. As illustrated by the different evaluation processes (e.g., processes 250, 260, and 270 for model 222 and processes 640, 650, and 660 for model 622), different evaluation thresholds might be used for the models 222 and 622 and thus the evaluation processes might evaluate the performance of models 222 and 622 differently.

Figure 8:
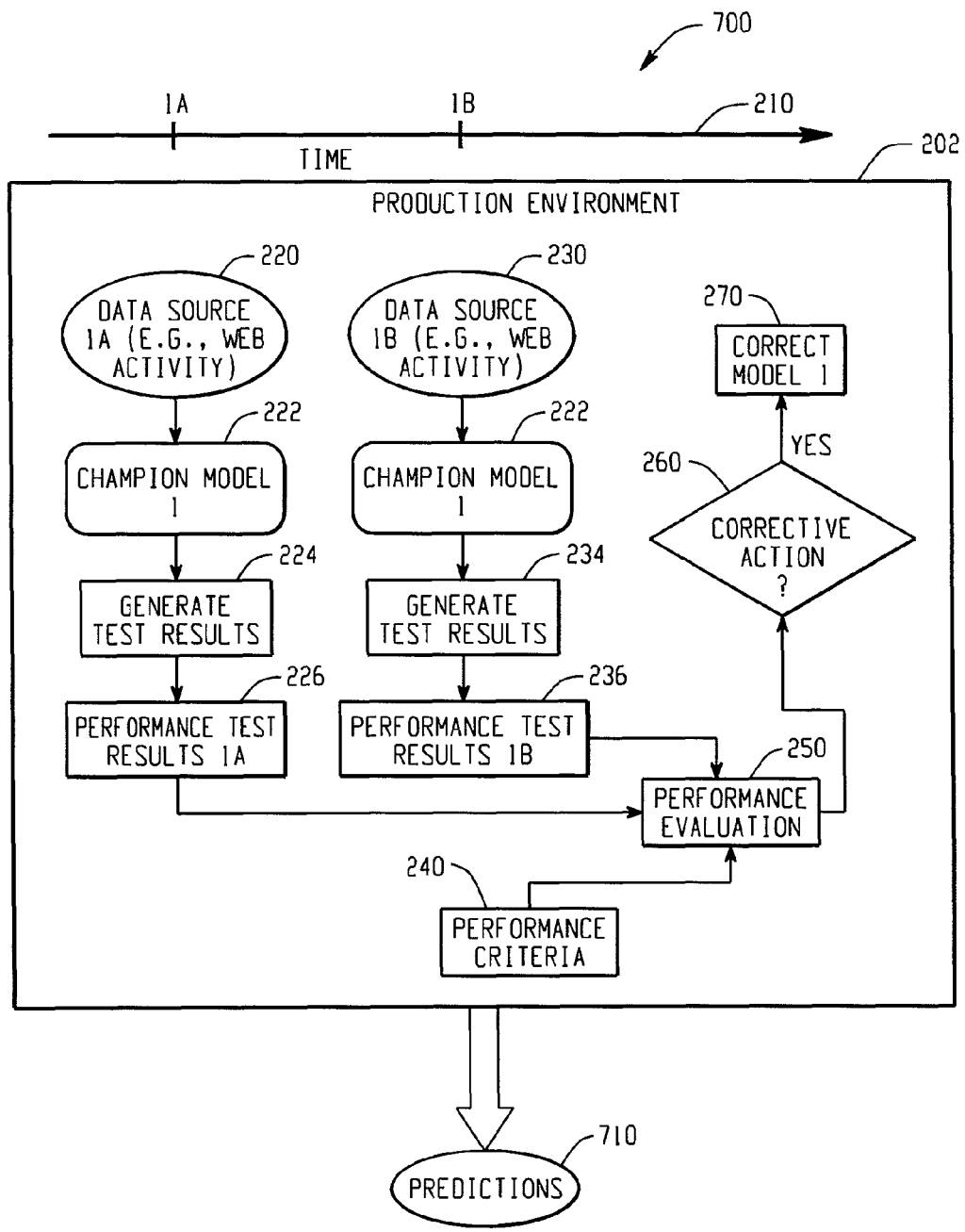

There can be many different types of production environments that can utilize a model manager. FIG. 8 provides an illustration of a particular production environment at 700. With reference to FIG. 8, the production environment 202 can be an e-commerce site wherein users interact with the site to browse and order products or services from the site. In this illustration, data sources 220 and 230 could be: web logs of user web site and/or browsing/purchase activity, and the champion model 222 can be provided in the production environment 202 in order to make predictions 710 within the production environment 202. The predictions 710 can be what items for purchase should be recommended in real-time to a browsing user.

Figure 9:
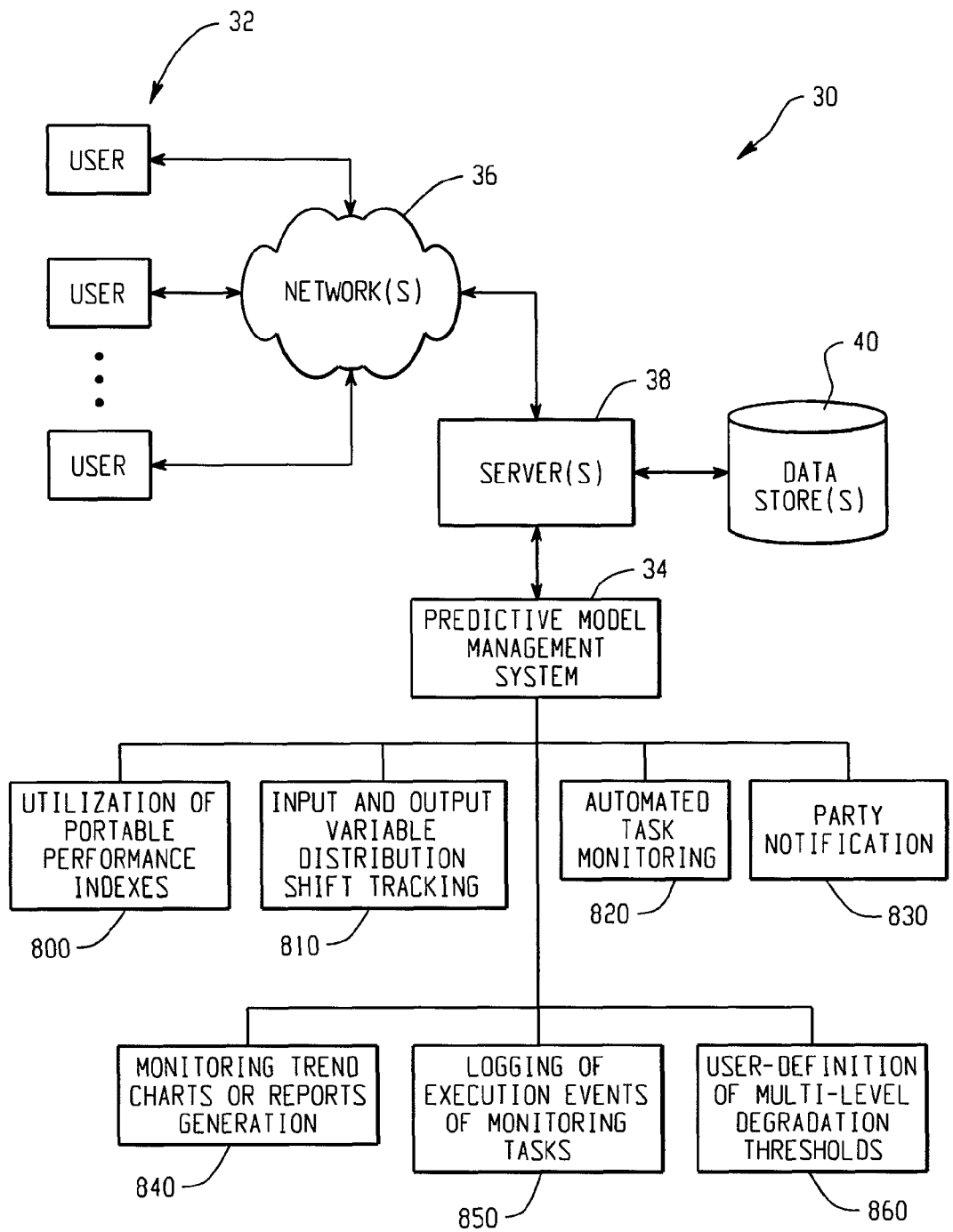
FIG. 9 is a block diagram depicting one or more features a model manager may use for managing predictive models.

To aid an organization or individual confronted with so many active production models, a model manager can be configured to include one or more of the following processes or tools as shown in FIG. 9:

Support portable performance indexes via process 800. Performance indexes (e.g., performance criteria) can be portable in the sense that they can be applied to many different types of models. Examples of different types of models include decision tree models, neural network models, logistic models, and any other supervised model. These indexes can then be used to define performance degradation thresholds. For example, a model manager can provide the following portable performance indexes: lift5Decay, lift10Decay, lift15Decay, lift20Decay, and so on. For a more specific example, the current lift of the top 5% for model A is 4.5. Is the lift value good or bad? This may not be known unless the top 5% model lift value is known (for example, 5.0) computed on a development test partition. Lift5Decay, in this particular case, is equal to (5.0−4.5)/5.0. Because lift5Decay is a portable performance index, it can be used by many models for performance monitoring purposes.

Track input and output variable distribution shifts via process 810. This tool can help detect the variable distribution shifts for both target and predictor variables. The tool can make sure that the binning definitions for a continuous variable are reused for comparing variable distribution and that outlier effects for binning are avoided or reduced.

Automate the monitoring tasks via process 820. Model monitoring tasks can be scheduled to run at a variety of time periods.

Notify interested parties when at least one threshold is crossed via process 830. A model monitoring tool can notify users via email, for example, when at least one user-defined threshold is crossed.

Provide monitoring trend charts or reports via process 840. Charts showing how the model degradation evolves over time are useful for the model monitoring process.

Log execution events of monitoring tasks via process 850. The events of model monitoring tasks can be logged so that the entire model monitoring process is traceable.

Allow user-defined multi-level degradation thresholds via process 860. Users can define multiple levels of performance thresholds so that warning notifications are generated before alert notifications. (Note: An alert condition is more serious than a warning condition.) If users receive a warning notification regarding a model performance and build a new champion model in response to correct the model degradation problem, then they might not receive alert notifications at all down the road when the new replacement champion is deployed.

As mentioned above with respect to process 800, a set of performance indexes can be used to set performance index degradation thresholds for predictive models. When these indexes are used appropriately in model management environments, obsolete predictive models can be identified. A set of indexes could include:

Lift5Decay
Lift10Decay
Lift15Decay
Lift20Decay
giniDecay
ksDecay
P1
P25

Lift5Decay: When a lift curve is based on 20 data points (i.e., there are 20 bins), then each bin represents 5% of the target population of interest. Let us define "the lift value of the first bin" as "lift5," "the accumulated lift value of the first two bins" as "lift10," "the accumulated lift value of the first three bins" as "lift15," and so on. Let us define two time points: A and B where B>A. Lift5Decay=(lift5 of time B−lift5 of time A)/(lift5 of time A)—i.e., Lift5Decay is the lift performance decay based on the top 5% of the target population of interest from time A to time B.

Lift10Decay: Refer to the lift5Decay discussion above. Lift10Decay=(lift10 of time B−lift10 of time A)/(lift10 of time A)—i.e., Lift10Decay is the lift performance decay based on the top 10% of the target population of interest from time A to time B.

Lift15Decay: Refer to the lift5Decay discussion above. Lift15Decay=(lift15 of time B−lift15 of time A)/(lift15 of time A)—i.e., Lift15Decay is the lift performance decay based on the top 15% of the target population of interest from time A to time B.

Figure 10:
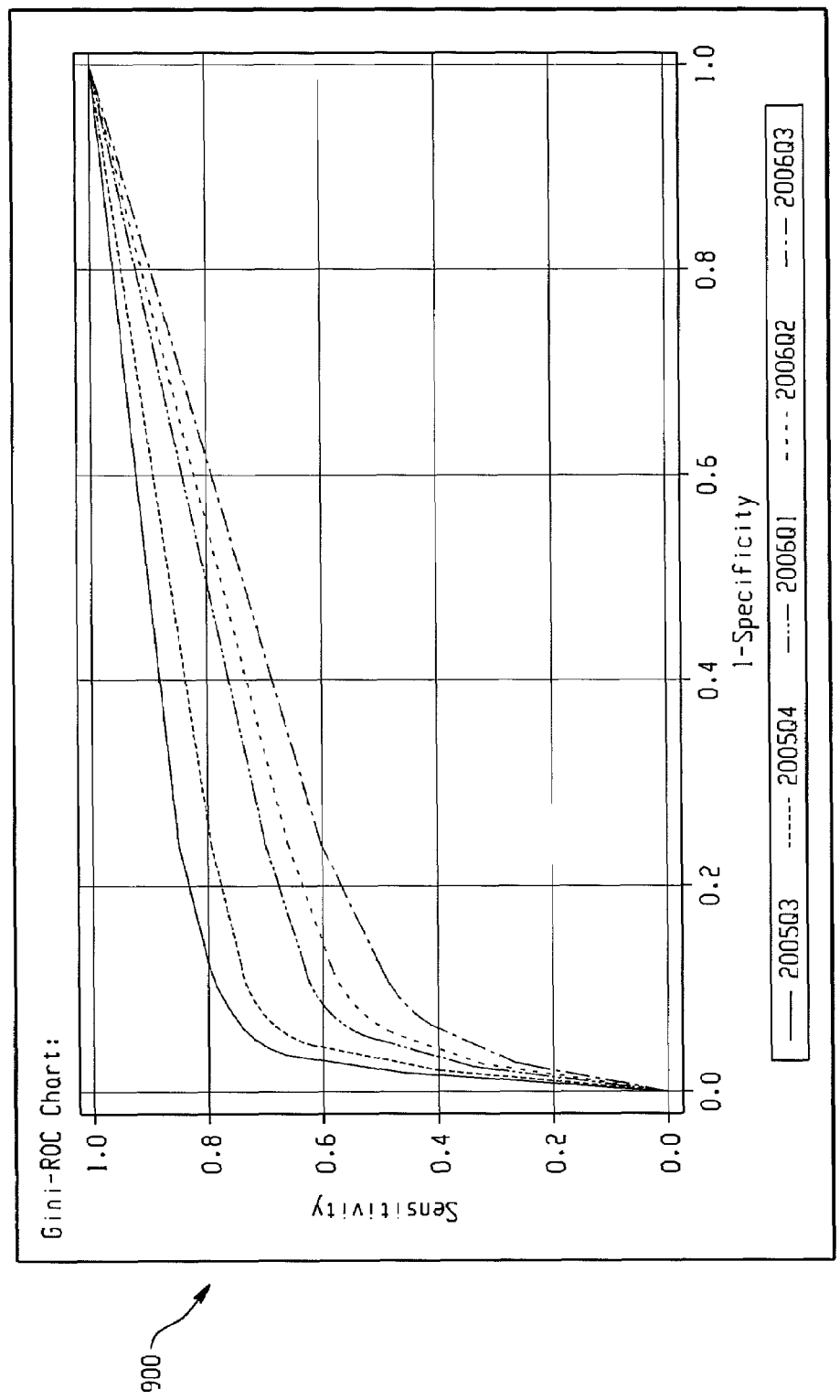
FIG. 10 is a graph illustrating an ROC (Receiver Operating Curve) chart.
Figure 11:
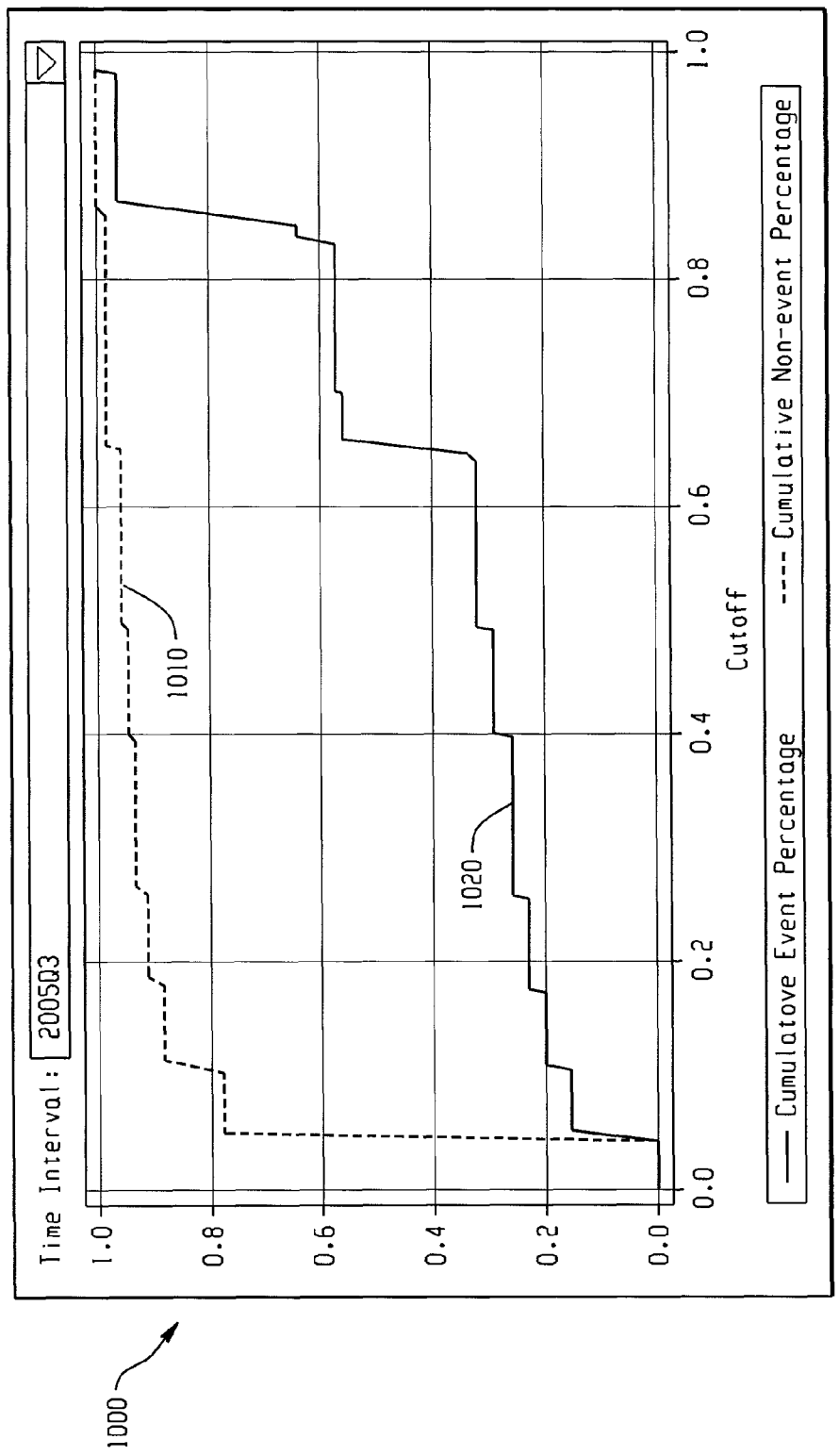
FIG. 11 is a graph illustrating a Kolmogorov-Smirnov (KS) chart.

Lift20Decay: Refer to the lift5Decay discussion above. Lift20Decay=(lift20 of time B−lift20 of time A)/(lift20 of time A)—i.e., Lift20Decay is the lift performance decay based on the top 20% of the target population of interest from time A to time B.

giniDecay: As illustrated at 900 in FIG. 10, an ROC (Receiver Operating Curve) chart is a type of model performance assessment chart for binary classification models. The area under a curve is called an AUC or Gini index. The Gini index almost always becomes smaller over time. Let us define two time points: A and B where B>A. The giniDecay=(Gini index of time B−Gini index of time A)/(Gini Index of time A)—i.e., giniDecay is the Gini performance decay from time A to time B.

ksDecay: A Kolmogorov-Smirnov (KS) chart is a chart that has two curves (e.g., curves 1010 and 1020), as depicted in FIG. 11. The maximum vertical difference of the two curves is called a KS statistic. Typically a KS statistic decreases over time. Let us define two time points: A and B where B>A. ksDecay=(KS statistic of time B−KS statistic of time A)/(KS statistic of time A)—i.e., ksDecay is the KS performance decay from time A to time B.

P1: KullBack-Keibler information index (KK index) is used to measure the deviation between two distributions. Typically the index is used to compare the distribution of a variable at time A and the distribution of the same variable at time B.

Kullback-Keibler information index=Sum[(% frequency of bin i of distribution 1−% frequency of bin i of distribution 2)*ln((% frequency of bin i of distribution 1/% frequency of bin i of distribution 2)].

From the formula above the KK index is zero when comparing two identical distributions. Note the KK index is applicable to both numeric and character variable types. A common rule of thumb in the modeling industry is that when the index is smaller than 0.1 then the distribution deviation is insignificant; when the index is between 0.1 and 0.25, the distribution deviation is mild; when the index is larger than 0.25, then the distribution index is significant. Now Let us define what P1 is. P1 is the number of predictors whose Kullback-Keibler information index each exceeds 0.1.

P25: Refer to the "P1" discussion above. P25 is the number of predictors whose Kullback-Keibler information index each exceeds 0.25.

As mentioned above, a model manager can use process 810 of FIG. 9 which contains standardized performance evaluation criteria to indicate diminished model performance when input or output variable distribution shift beyond a specified level. For example, the following illustrates the shift of input variable distributions being analyzed to determine whether a shift beyond a particular threshold has occurred and if so, then a replacement model is to be generated. The following table shows different percentages of counts in ten separate bins at two different points in time:

| Bin # | Percentage of counts in each bin for variable X at time 1 | Percentage of counts in each bin for variable X at time 2 |
|---|---|---|
| 1 | P11 | P21 |
| 2 | P12 | P22 |
| 3 | P13 | P23 |
| 4 | P14 | P24 |
| 5 | P15 | P25 |
| 6 | P16 | P26 |
| 7 | P17 | P27 |
| 8 | P18 | P28 |
| 9 | P19 | P29 |
| 10 | P1A | P2A |

Based upon the data in this table, a deviation index (i.e., variable shift amount) can be calculated as follows:

Deviation index=$(P11-P21)*\ln(P11/P21)+(P12-P22)*\ln(P12/P22)+(P13-P23)*\ln(P13/P23)+\ldots(P19-P29)*\ln(P19/P29)+(P1A-P2A)*\ln(P1A/P2A)$ A general formula for the calculation above is:

Deviation index=SUM $(P1i-P2i)*\ln(P1i/P2i)$ $i=1$ to 10

Accordingly, if the percentages in each bin are the same, then deviation index=0; in the credit risk industry, it is a mild change if 0<deviation index<0.1; and it is a significant change if deviation index>0.25. When variable X (from the above table) is an input variable, then the deviation index is also called a characteristic index. When variable X (from the above table) is an output variable, then the deviation index is also called a stability index. Note that a continuous variable can be automatically binned based on a variety of methods. For categorical variables, there is no need to bin them to compute the deviation indexes—i.e., just use each distinct value of the variable as a bin to calculate the deviation index.

The following example operational scenario provides additional illustrations of processes 820-860 that are depicted in FIG. 9. When the model performance indexes above are used in a model management environment, automatic model performance monitoring can be accomplished via the automated task monitoring process 820. In a model manager, a user can define threshold expressions that consist of those performance indexes. At the report generation time (e.g., when a report macro is executed), those performance indexes are computed, and pre-defined threshold expressions are evaluated. Note that threshold expressions are defined based on model monitoring report type—e.g., users may have hundreds of active production predictive models that they want to track model performance against; however, there is no need to set a performance threshold expression for each production model.

Users can pre-configure via notification process 830 who will receive notification messages regarding model performance degradation. Process 840 can generate analytical charts which show how the model degradation evolves over time and are useful for the model monitoring process. These events of the model monitoring tasks can be logged via process 850 so that the entire model monitoring process is traceable. Such traceability can provide an understanding of how the model form and usage are evolving over time.

The code at 1100 in FIGS. 12A-12B provides an example of setting up performance monitoring job parameters. For example, a stability analysis monitoring job is set at 1110. Parameters are established at 1112 to populate a stability table in a monitoring database. Model performance warnings and alerts conditions are set at 1114 and 1116 respectively. Based upon these conditions and after the performance monitoring reporting jobs are done (via job scheduling or not), the model performance monitoring report macro decides whether or not a warning/alert notification message should be sent out to pre-specified recipients.

FIG. 13 provides at 1200 an example of a notification message. Note that in the example notification message, there is one row for each model performance report instance whose threshold expression is evaluated as true. Also note that in a model manager, users can define via process 860 (of FIG. 9) thresholds at multiple levels such as at the following levels: warning and alert. Users can take advantage of these two levels if they want to receive warning messages before an "Alert" situation actually occurs.

As an additional example of report-related code, a report macro code can be defined by users once and used multiple times. A benefit of this is that the user macro code can be scheduled to run recurrently without the need of users to change the macro code. The following code provides an example of generating a report:

```
%MM_RunReports(localpath=&_MM_JobLocalPath,
    mapTable=&mapTable,
    user=&_MM_User,
    password=&_MM_Password);
```

A model extraction macro can be run before any model performance monitoring reporting macro is run so that the latest production model is always deployed. This model extraction macro code could be a pre-code to the report macro code—i.e., it could be scheduled to run every time before the report macro is run. The following code provides an example of obtaining a model:

```
%MM_GetModels(channel=c:\mm.test\channel,
    localPatha=c:\mm.test\model.extraction);
```

There can be multiple levels of report job execution time in the model manager, such as the external job scheduler's scheduled job execution time and internal job execution time. Typically report jobs are scheduled to run weekly, monthly, quarterly, or at whatever irregular time intervals users define. Users can manually run or use their job schedulers to run report jobs. External job execution (via job scheduler or manually submitted) triggers a report macro to be executed. However, it is the internal job time definitions that drive the actual report jobs. A report macro creates and maintains a metadata table (i.e., a job control table) that, among other things, helps to prevent report jobs being executed twice undesirably. For example, it is a monthly report job, but somehow a user accidentally executes the report macro twice, once on March 2 and later on March 7. Nevertheless, the report macro knows not to run the job on March 7 since it knows that the job has just been run 5 days ago successfully based on the job metadata saved in the job control table. Also note that if the March 2 jobs are not completely successfully, then March 7 will pick up the job from where the jobs previously failed.

Some columns in a performance report can be intentionally listed side-by-side for easy cross reference. For example, when you see an alert threshold is evaluated as true, you can see the pre-defined threshold expression in an adjacent column; and move just a little further, you can see the values of corresponding performance indexes. This special arrangement of column positions may be used to help users/administrators more easily inspect why a threshold expression is evaluated as true or false.

In response to a degradation threshold being reached, a variety of corrective actions can be done, such as building a replacement predictive model to replace a model in order to improve performance of predictions. The replacement predictive model may then be recalibrated using new data. The replacement predictive model and recalibration could be performed automatically or manually. For example, the following script automates the process of developing a replacement model, wherein the script accesses as input a table that holds the input data and uses that data to calculate parameters for a replacement model:

```
proc logistic data   = &_InputTable
    outest   = &_OutputEstimateTable
    outmodel = &_OutputParameters;
    class reason derog job;
    model bad = CLAGE DEBTINC DELINQ DEROG JOB
    LOAN MORTDUE
        NINQ
        REASON REASON VALUE YOJ ;
    run;
    /* where values for _InputTable, OutputEstimateTable, _Output-
        Parameters above are set via an appropriate mechanism */
```

A model manager can be used in many different types of operational scenarios. For example, within a possible financial credit scoring operational scenario, a corporation can develop and deploy large numbers of predictive models. Some corporations may take many months (e.g., 10 months) to go through the entire model life cycle management process of preparing the analytical base tables, developing models, and deploying the champion model. Delays in deploying a model obviously result in lost opportunities and might even result in a model that no longer provides useful predictions due to changes in market and economic conditions. Model deployment for many organizations simply takes too long.

Model deployment setbacks can often be attributed to technical integration issues. For example, many organizations lack a common integrated framework for comparing candidate models to select the champion model. Models are also often developed by more than one data modeler using a host of different algorithms along with potentially different development and test data sources which further add to the complexity of selecting models. The process used to develop the model along with the definition of the development and test data sources can be documented and accessible so that others can review and update the model as needed.

To further illustrate difficulties that can arise in this context, the following discussion is provided. Analysts often use a data mining software package that generates model-scoring code in a particular programming language. However, the IT department scoring officer might convert the scoring code to another language either due to policy or to enable integration of the code into an entirely different client system. For example, the scoring code might need to be integrated into a call center application which is on a different operating system than the one originally used to develop the models. Code conversion introduces the potential for making costly translation errors. A single error in the model-scoring logic results can easily result in an incorrect classifier which can cost the company millions of dollars. Converting the scoring code, which often exceeds a thousand lines, is usually a slow manual process. Some companies even have a multi-step process which may require translating the model into an intermediate document with comments describing the scoring logic which the scoring officer then converts to another language. Scoring also may require that the model inputs be available in the operational data store. A requirement for many corporations is a set of good controls for data integrity and binding for integrating the model-scoring logic with the operational data store.

Many corporations also need a central repository for storing models along with detailed metadata for efficient workgroup collaboration. Their model complement has become too large to maintain and review on a consistent basis given resource constraints. The challenge to save all documents that are related to a model and be able to retrieve those documents easily when needed is a common business problem.

Model management can also involve a collaborative team of data modelers, data architects, scoring officers, and validation testers. Many organizations are struggling with the process of signing off on the development, validation, deployment, and retirement life cycle management milestones. They need to readily know exactly where each model is in the life cycle, how old the model is, who developed the model, and who is using the model for what application. The ability to version-control the model over time is another business need which includes event logging and tracking changes to understand how the model form and usage are evolving over time.

Model decay is another challenge faced by many organizations. Metrics are helpful to determine when a model needs to be refreshed or replaced. Retired models also should be archived. More reliable management of the score repositories may also be a requirement to ensure that quality representative data is available to evaluate model performance and profitability over time.

A model manager can be designed for the selection, maintenance, and continuous enhancement of predictive analytical models for operational decision making. In this example, a model manager enables processes to effectively manage and deploy analytical models by delivering functionality for each stage of the model life cycle. The model manager includes a secure, centralized repository for storing and organizing models. Models are organized by projects that map to the business purpose or application. Each project contains the champion and challenger models along with extensive metadata, scoring code, data sources definitions, and supporting documentation. Supported models include prediction, classification, segmentation, and rules-based models.

Figure 14A:
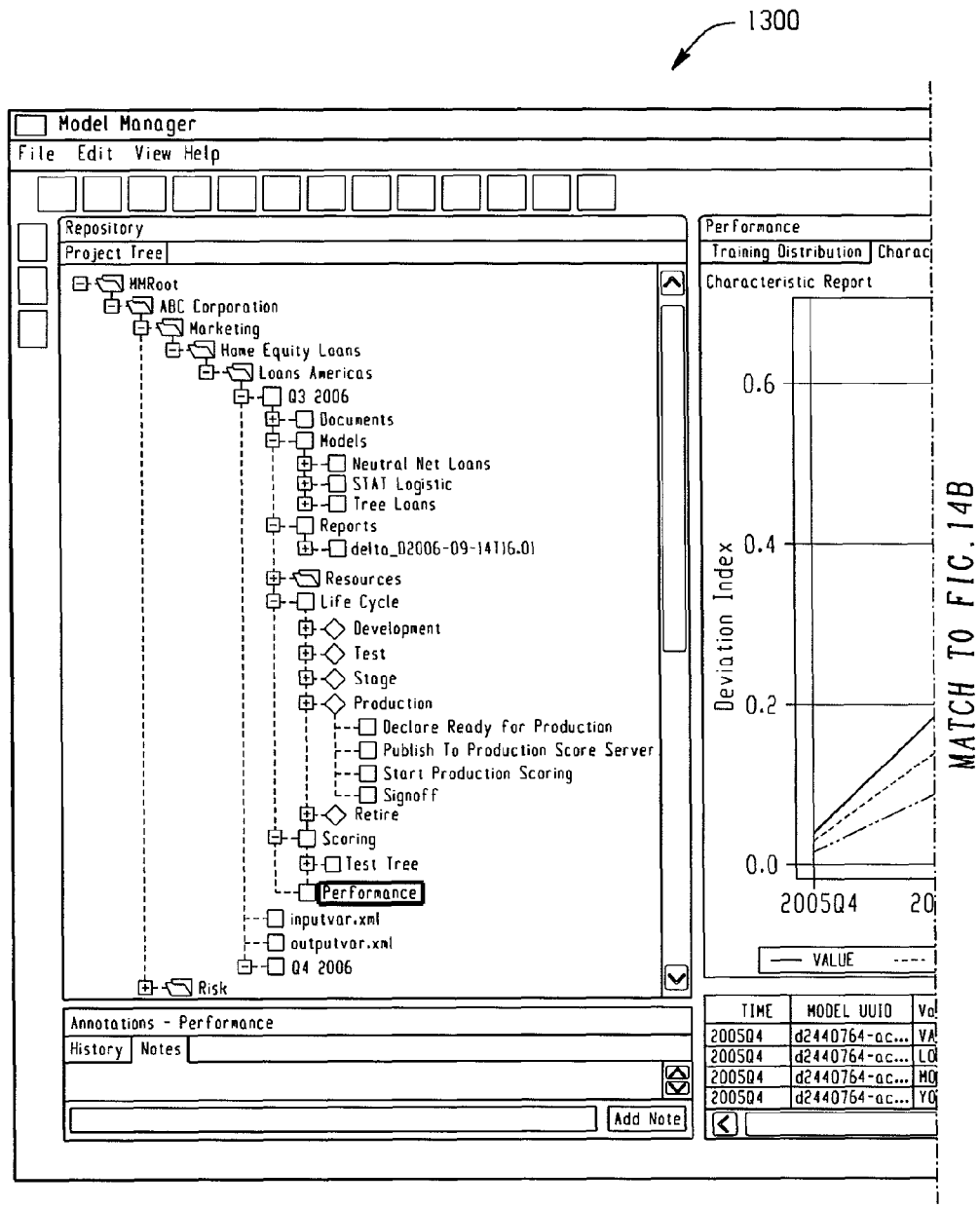
FIGS. 14A-14B illustrate a model manager that includes a project-based repository for cataloging analytical models and also several model comparison and monitoring reports.
Figure 14B:
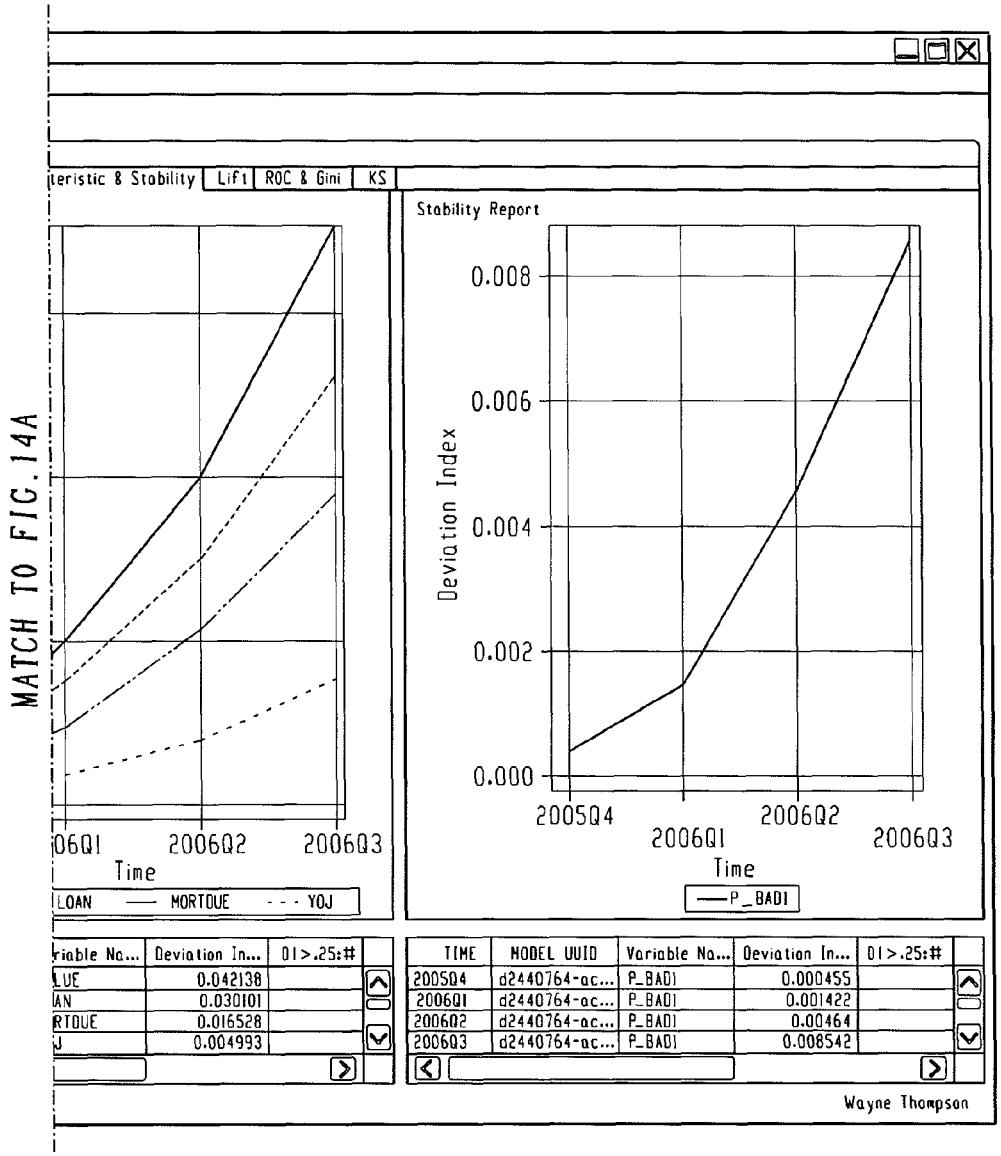

FIGS. 14A-14B show at 1300 a model manager that includes a project-based repository for cataloging analytical models and also several model comparison and monitoring reports. A model manager includes a set of life cycle templates for pushing the model through the development, validation, deployment, and retirement milestones. The templates include start and completion dates along with completion status reports. Templates can also be customized to meet the organization's specific model management signoff processes.

Prior to deployment in production, scoring officers can develop test scoring jobs to ensure that the model is accurate and produces output as expected without any errors or warnings. Lastly, the model manager includes performance monitoring reports to determine if the model has degraded as it is being scored over time in the operational environment. A publishing framework is also included to keep key individuals informed of model life-cycle milestone events and performance monitoring alerts.

A company should be able to manage models from the development phase through to the production environment. Model life-cycle management is an efficient iterative process that includes in this example the following stages:
  Determine the business objective
  Access and manage the data
  Develop the model
  Validate the model
  Deploy the model
  Monitor the model
Determine the Business Objective The first stage is to identify what type of model is needed, which type of application the model will be used for, and develop a strategy to ensure that the business units understand how the model is to be utilized once it is deployed. Typical models include those used for predictive modeling of customer behavior, risk management, and credit scoring. Applications can include customer retention, credit origination, transaction authorizations, fraud detection, and marketing campaigns. These concerns drive the data acquisition and model development processes.

Access and Manage the Data

The second stage is to manage the vast proliferation of data. Data management and data quality are components of the mining process; this is where systems spanning multiple platforms and containing multiple data sources (for example, accounts receivable, accounts payable, call reports, demographic data, financial data, card holder data, and credit bureau data) may need to be integrated and synchronized into a clear and coherent format. Both the analytic model development and production deployment environments may need to be aligned in this data management process to create data consistency and to ensure that a single version of the truth is utilized throughout the model life cycle.

Developing a predictive model will involve collecting appropriate data, sampling, aggregating data attributes, performing segmentation analysis, and conducting other in-depth data analyses. For example, data sources could be brought together at the customer or account level from many disparate sources. This can include billing and payment transactional data, demographic figures, financial data, and so on. Transformations are then applied to further enrich the data. Transformations include:
  Computing rollup variables such as the average, maximum, and total balance across all accounts for a given customer
  Computing interval variables such as how long an individual has been a customer, value of the last purchase, and so on
  Applying the logarithm to heavily skewed data such as median household incomes
  Transforming multimodal distributions to categorical values
  Filtering outliers and replacing missing values
  Segmenting customers into groups with common attributes
  Creating interaction terms
Many organizations will attempt to create a standard data source for all modeling activities. This process can help to enable auditing activities, standardize best practices, and simplify deployment with varying degrees of success. For business objectives that do not change, this can be very effective. However, when presented with new target variables, the data modeler often will return to the source data systems to acquire new data not already found in the model training data mart.

Figure 15:
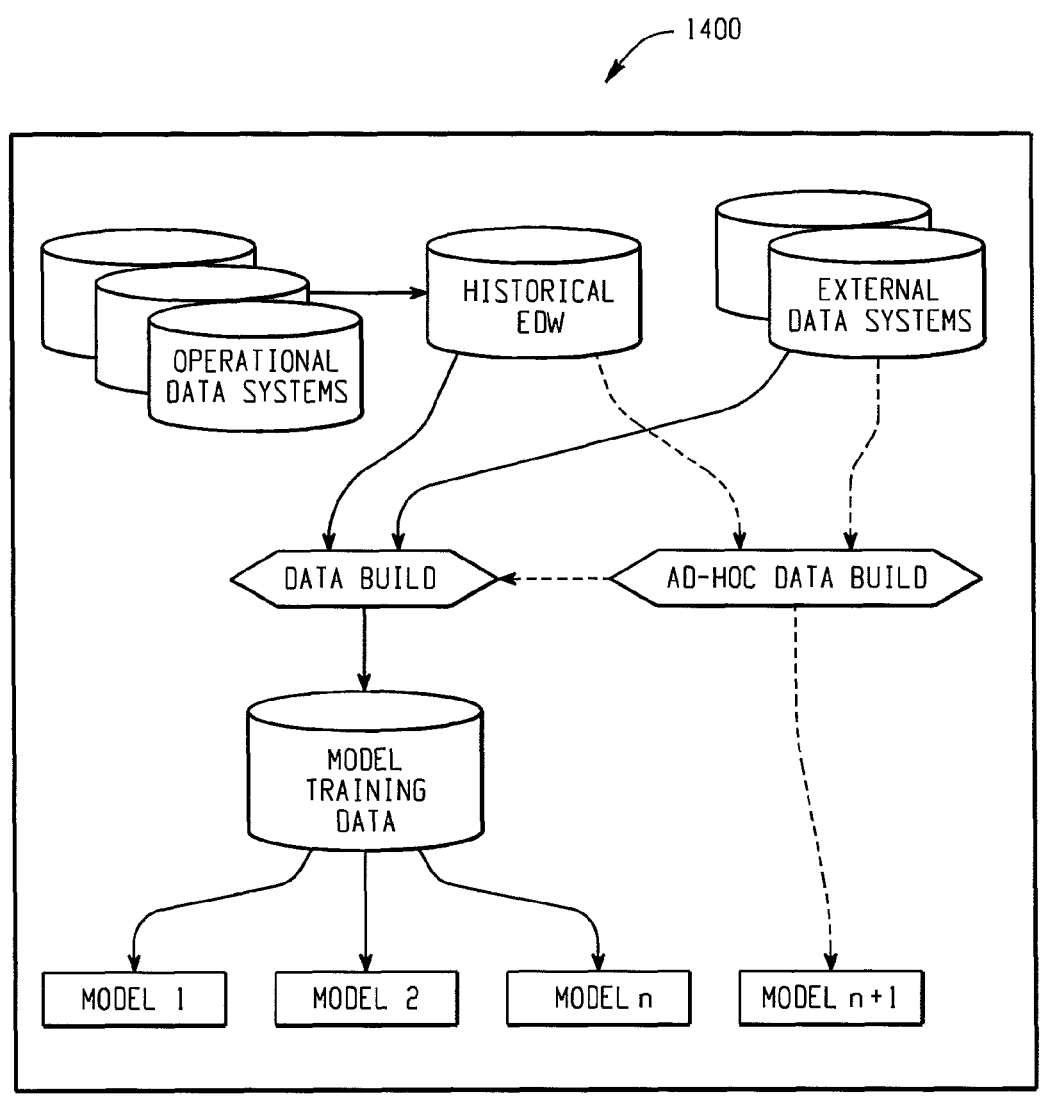
FIG. 15 is a block diagram depicting a prototypical data build for modeling data.

You can allow both types of activities and provide tools that capture new data acquisition logic and incorporate it into the model training data mart. The model manager can aid this practice by both specifying the model development data to be used for new projects and tracking the model training data actually used in individual models. A prototypical data build for modeling data is shown in FIG. 15. FIG. 15 depicts at 1400 a prototypical data build for modeling data incorporating both routine model creation and new model creation. The resulting data aggregation code produced in the data management stage of the financial model will be further enriched as it is integrated into the model development code.

Develop the Model

The third stage is to build the model based on the representative training data source defined in the data management stage. This process involves the application of exploratory statistical and visualization techniques, variable transformations, filtering outliers, data replacement, segmentation, clustering, predictive modeling algorithms, and model validation as examples.

The use of these techniques will be guided by the business objective. Application credit score models are highly regulated in their use of data and model forms by both U.S. fair lending guidelines and Basel II regulations. Behavior credit score models are used to rate existing loan portfolios and may be subject to both Basel II and Sarbanes-Oxley regulations. Many businesses have their own best practice guidelines which state that certain variables should be included, combinations of others should be excluded, and that a priori segmentation schemes should be honored.

Definition of the dependent variable (in this case typically, loan default) can have many forms such as time since last payment, number of missed payments, ratio of accrued interest, or formal loan cancellation. Customer acquisition and cross-sell models are typically based on response to previous promotions within some time period and/or through some channels. Manufacturing root cause analysis might be based on reported failure rates-per-unit lots. To accurately track model performance over time by following accuracy rates, the definition of the dependent variable should be consistent over time. If the dependent variable definition has changed, this should be noted as a new model form, and a new set of tracking statistics should be generated.

Model input terms have similar regulatory and deployment restrictions. Data used in building the model should be updated and available during the lifetime of the model deployment and scoring processes. Demographic and transactional data sources might change their field definitions and codes during the lifetime of a model; therefore, the modeler should build models that have robust missing value and range and value-checking logic and avoid terms that are known to be unstable or might not be consistently available.

Highly correlated input variables can lead to model sensitivity issues where slight changes in relative values of data fields can cause indefensibly large changes in predicted values. This is a typical concern when a model is expected to be in production for a long time. Aggressive variable selection, use of exploratory correlation statistics, and variable clustering can be effective in reducing long-term instability.

Many businesses implement a champion-challenger model strategy. The champion is often a model that has already been in production and is based on data from several previous time periods. Newer challenger models are built on data from more recent time periods. In high-throughput environments where thousands of models are generated, the functional form is most likely fixed and the models are simply retrained. In other environments, a data modeler might spend weeks developing a set of new challenger models. For both model monitoring and business auditing purposes, both champion and challenger models should be archived into a model database. They should be compared on blind test data that represents the most recent or most stable samples.

Figure 16A:
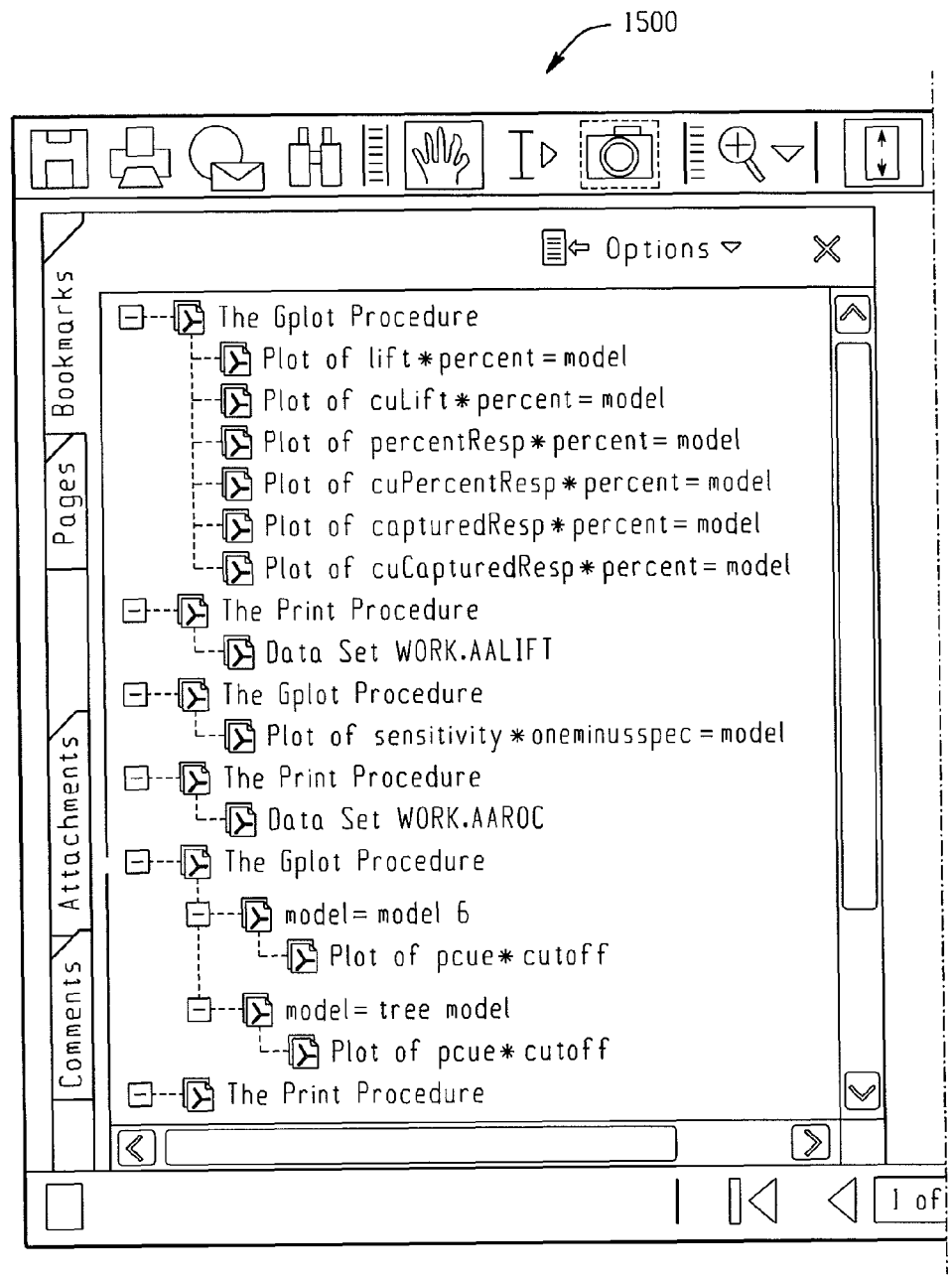
FIGS. 16A-16B show an example of a dynamic lift chart that compares the predictive capabilities of multiple competing models.
Figure 16B:
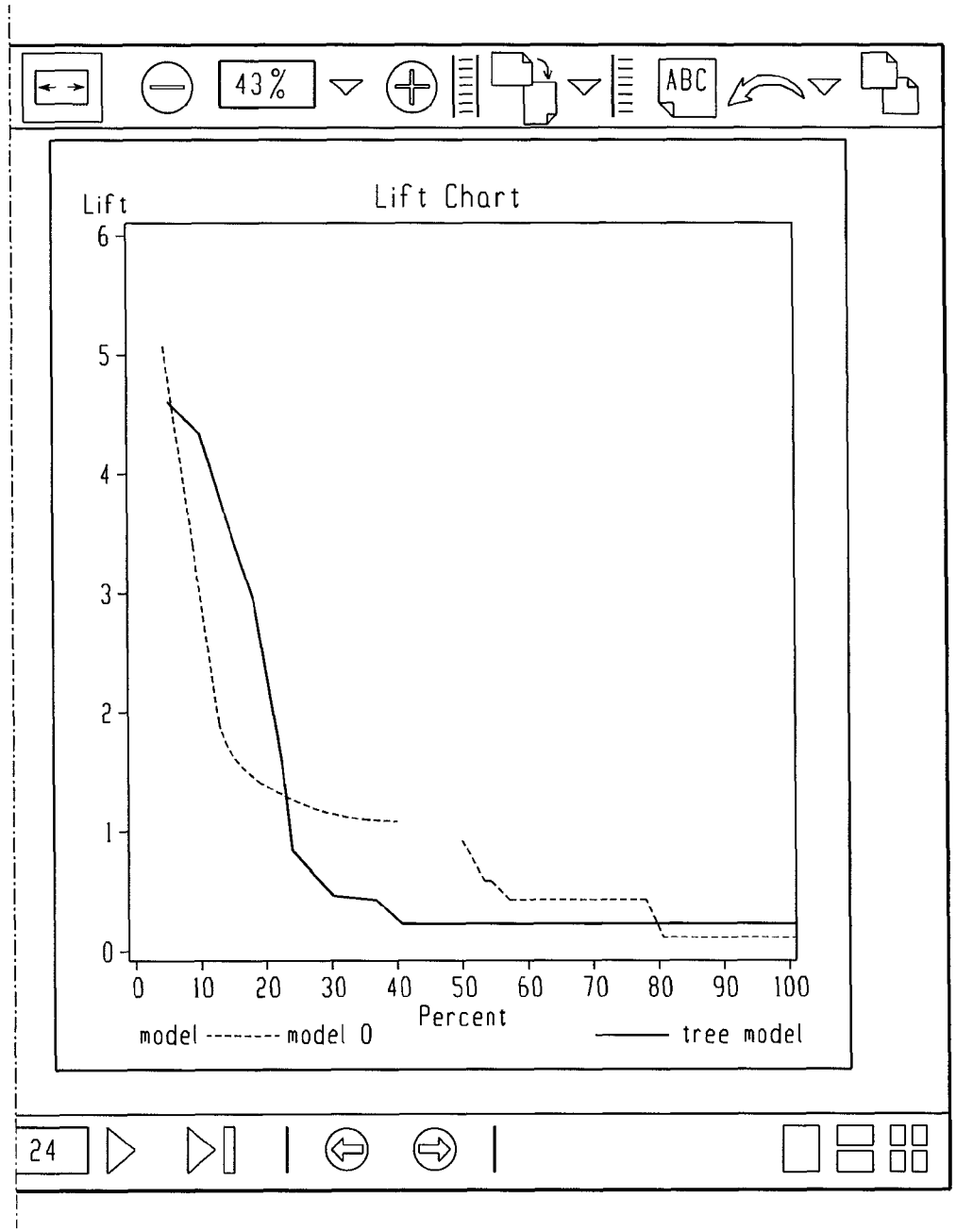

Users can use graphical user interfaces (GUI) capabilities to register a model to a metadata server (e.g., such as a metadata server provided by the assignee of this invention) where it can then be accessed by the model manager users. Users can use model registration macros provided by a model manager to automate a model registration process. Once registered, models from both products are represented by the following attributes:

Model score code
A list of essential input variables required by the model
A list of output variables created by the model
Data aggregation code used or developed by the data modeler
The functional form of the model, such as logistic regression, neural network, decision tree
The training data used to develop the model
The validation data used to control model over-fitting Once registered, the expected performance of multiple models created by users can be compared on blind test data sets. The model manager will score the models and compute statistics such as single-point error measures as well as lift and captured response values. FIGS. 16A-16B show at 1500 an example of a dynamic lift chart that compares the predictive capabilities of multiple competing models.

Validate the Model

With increased adoption of analytical methods for driving business decisions, predictive models are being viewed as intellectual assets for organizations. Each production model is valuable and could have significant impacts on corporate bottom lines, compliance, and legal/economic risks. This phenomenon is forcing more and more organizations to establish model validation as a formal business process.

Validating a model is not a one-time task but a continuous process. It typically includes one or more of the following:

Validate predictors for legal issues: While certain variables might be good predictors, they may result in unwanted risk exposure for an organization when used in a predictive model. For example, there can be legal reasons why variables such as age, gender, and/or race might not be used in the model-building process.

Validate data distributions: It is useful to understand the initial distribution of target and predictor variables in order to recognize distribution shifts over time. If distribution shifts are detected, it might be necessary to retrain the model on new data.

Validate analytical algorithms: The algorithms chosen to generate the models may need to be validated in light of the potential use of the predictive model. For example, certain models such as decision trees produce results that are easy to be interpreted. They enable you to answer questions like "Why was this customer denied credit?" Other models such as neural networks do not provide this sort of simple interpretation and hence might be inappropriate for certain applications. The trade-off between interpretability and prediction accuracy should be carefully considered at this stage.

Compare model-prediction accuracy: For a particular data mining project, modelers might use multiple tools to create a set of potential models. It can be difficult to compare models across tools, and model comparison might need to be done based on an independent data source that was not used in the model creation process.

Audit validation processes: Validation processes can vary over time. One thing that is consistent is that every step of the validation process should be logged. For example, who imported what model when; who selected what model as the champion model, when and why; who reviewed the champion model for compliance purposes; and who published the champion to where and when.

Perform pre-deployment scoring testing: Before a new champion model is published for production deployment, an organization might want to test the model for operational errors. This type of pre-deployment checking is valuable especially when the model is to be deployed in real-time scoring environments.

Monitor model performance: Once a champion model is published, it can be deployed repeatedly in a production environment. Typically, model performance degrades over time. Organizations may need to systematically detect performance degradation in order to weed out obsolete models and build new ones. Without appropriate design for monitoring automation in the first place, model performance monitoring processes could be time-consuming and error-prone.

A model manager can be configured as described herein to address one or more of these above tasks.

Deploy the Model

Once a model is validated, the business needs to put the model into production. This may require implementing a scoring system where the model function is applied to new data that might not have a dependent variable. Most scoring systems are batch style where thousands to millions of records are input to one or more models. If the business has efficiently defined a common modeling data set, a single data-building job can construct one table that serves many models. For a direct-marketing campaign, this job might be run ad-hoc by the modeling or IT staff and the scores sent to campaign execution staff. For model monitoring purposes, the model might be scored every month when new values for the dependent variable are available and real performance is compared to expected performance.

For models that contribute to operational business decisions such as an application scoring model or a cross-sell model, the target system is typically an operational or transaction handling system. Transactional systems have a defined throughput requirement which can impact the amount of input data that is used and the complexity of code that is executed. Often, these systems rely on pre-computed scores based on the most recent offline data. In this case, batch scores are loaded onto data systems that provide fast access to the transactional systems. Often, a significant number of models are needed for scoring, and scoring results are loaded before the next transactional time period. The transaction system can then use an indexed lookup to retrieve the model score for a known customer.

Figure 17:
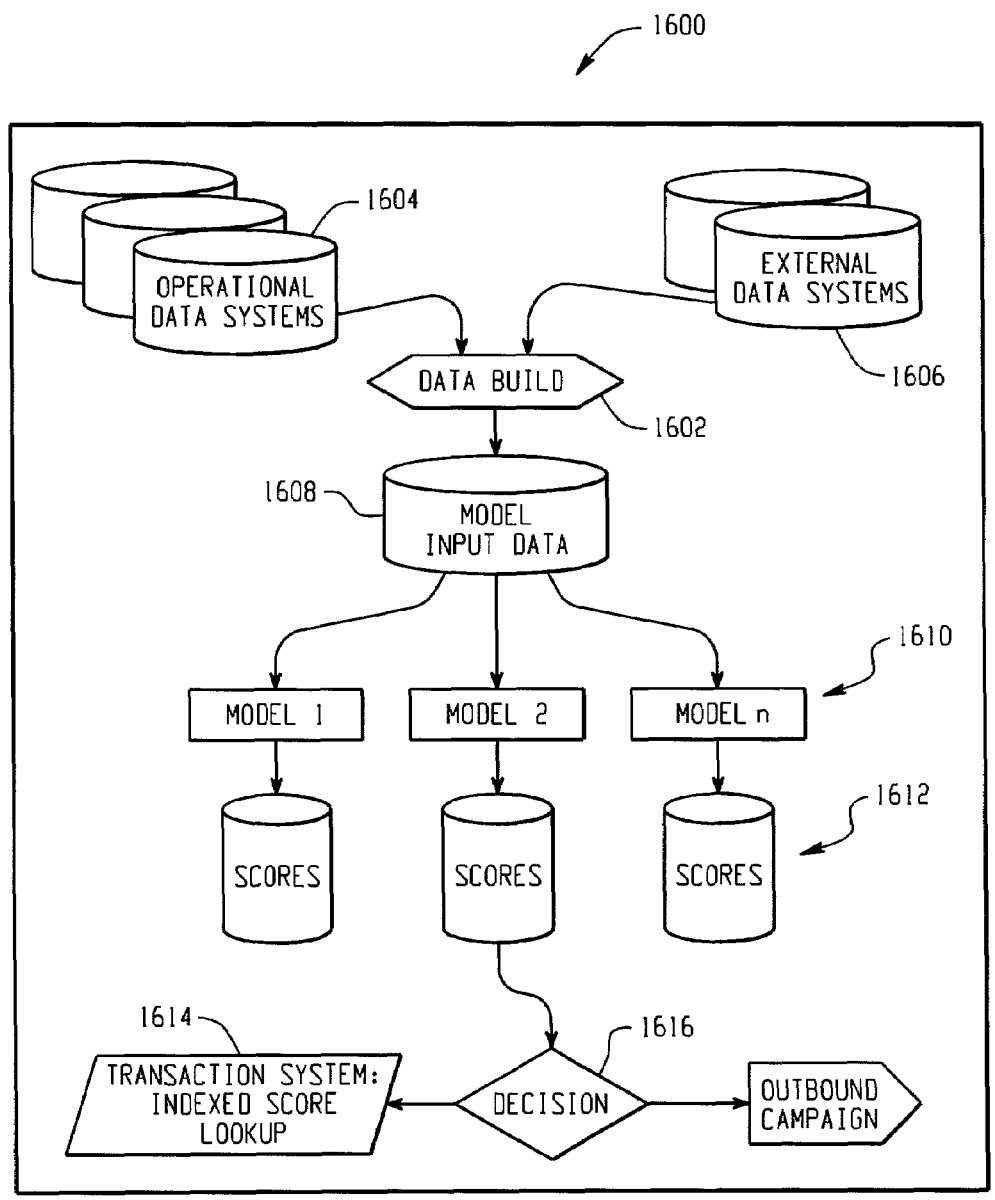
FIG. 17 provides an illustration of model management within the context of batch scoring.

FIG. 17 illustrates this case for batch scoring at 1600. With reference to FIG. 17, a data build process 1602 combines operational data 1604 with data 1606 from external data systems to create one master model input data set 1608 that can serve multiple models 1610. In a large organization, there might be many master data tables created. Model scores 1612 are then loaded into offline or online systems for efficient access by a transaction system in order to make decisions at 1616. For high throughput needs, a model manager can support concurrent execution through use of multi-processor software such as MP Connect which is available from SAS Institute Inc.

A system can be configured to asynchronously service model-scoring requests. For example, Message Queue (MQ) technology can be used which is available from IBM or TIBCO. The scoring client forms the MQ data packet and sends it to the MQ server. The scoring server retrieves the MQ data packet, executes the corresponding score code, and posts the output scores to the MQ server. The client then retrieves the indexed output from the MQ server and continues processing. Message Queue systems are used in many industries.

Figure 18:
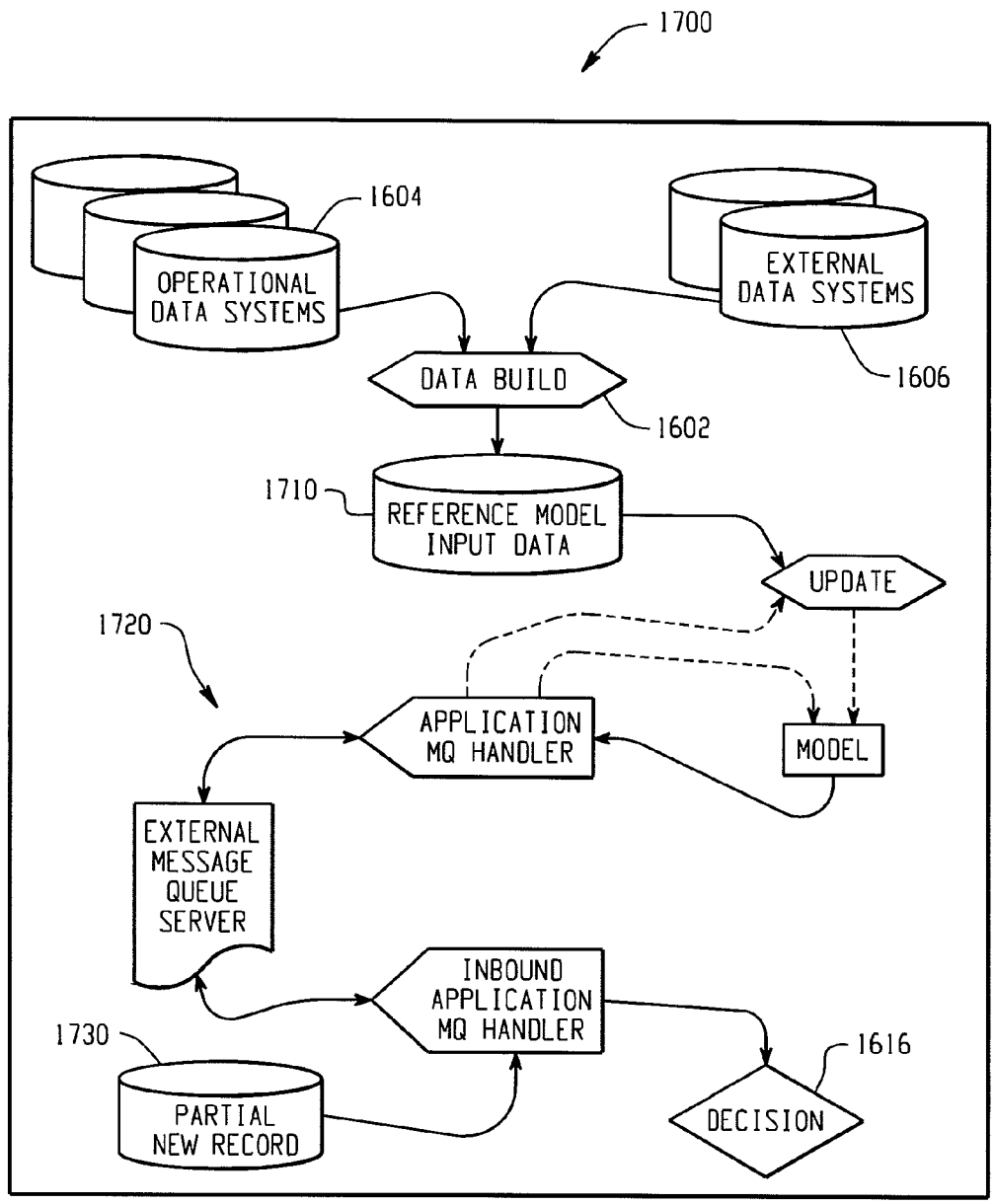
FIG. 18 provides an illustration of model management within the context of on-demand scoring.

FIG. 18 illustrates this case at 1700 for on-demand scoring. In this case, MQ technology 1720 is employed to provide a single record of data to the system for model scoring. Optionally, a reference model input table 1710 can be used to provide data fields that are not provided by the client application. In that case, the server updates the full data record with the new partial data record 1730, runs the score code, and returns the score or resulting decision to the client application through the asynchronous MQ server. This design is appropriate for many on-demand scoring applications.

Accordingly, a single-score code program can service all of these environments: ad-hoc, batch, and on-demand. Because the program does not have to be recoded and tested in a new execution environment, organizations can save valuable deployment time. Models that are put into production faster will show a better ROI than models that take longer to deploy. The model manager provides tools to help modelers and IT staff deploy predictive models to multiple environments.

Monitor the Model

The final stage is to manage the model in a production environment. This includes moving the executable to an operational platform, running model performance reports, distributing the generated reports, and revalidating the model. Periodically, the life cycle of the model repeats itself with the data management stage when the customer base has evolved sufficiently to require new sample data, or the factors that contribute to predictability have changed.

A champion predictive model is deployed for a period of time in production environments. Its predictive performance often degrades over time. A champion model should retire when its performance degradation reaches a certain threshold. Therefore, model monitoring tasks can be routinely done to identify underperforming models in time to prevent problems caused by obsolete models.

Figure 19:
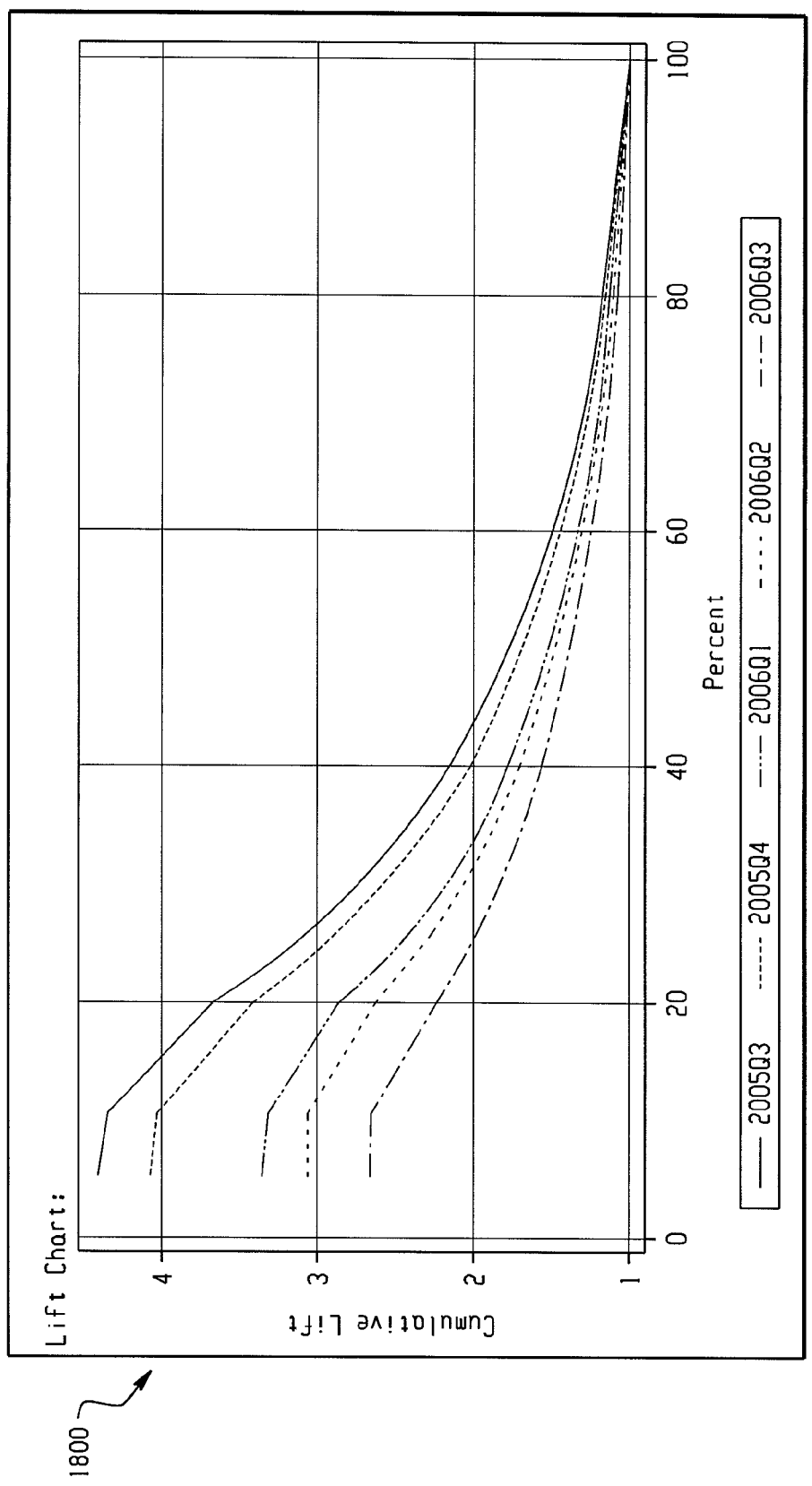
FIG. 19 provides an illustration of a model degradation lift chart that shows how model lift degrades over time.

The model degradation lift chart in FIG. 19 shows an example of how model lift can degrade over time. In general, a lift chart is used herein for the purpose of assessing how good a predictive model is.

The following example illustrates how a lift chart can be created. A company has selected 5000 customers to send out promotional mailings. Six weeks later, the company classified each of those 5000 customers as either responder or non-responder. A modeler then partitioned the 5000 customers into two partitions: 3000 customers for model training, the rest of 2000 customers for model testing. There are 140 responders out of the 2000 customers in the test partition.

Two predictive models are built using the training partition. Each model generates score code that is used to compute customer scores. A score is used to predict how likely a customer would respond positively to promotional materials. We can assess which predictive model is better based on the fact that 1) the test partition is not used in model training, and 2) each customer in the test partition is already known as a responder or non-responder. The following shows how the computation is done to create a lift chart. First, the score code is used from each model to create scores for each customer in the test partition.

| CustomerID | Response | Income | Age | Sex | ... | Model 1 Score | Model 2 Score |
|---|---|---|---|---|---|---|---|
| 10015 | Y | 35,000 | 61 | M |  | .912 | .811 |
| 20034 | N | 76,000 | 26 | F |  | .145 | .267 |
| 10067 | Y | 21,000 | 49 | M |  | .487 | .552 |
| . |  |  |  |  |  |  |  |
| . |  |  |  |  |  |  |  |
| . |  |  |  |  |  |  |  |

Now model 1 scores are sorted in descending order, then the result are partitioned into 20 bins of equal-size; then the number of Y's (i.e., "yeses") in each bin is counted. The same is performed for model 2. This generates the following table of responder counts:

| Bin # | Model 1 | Model 2 | Baseline Model |
|---|---|---|---|
| 1 | 36 | 32 | 7 |
| 2 | 30 | 27 | 7 |
| 3 | 15 | 21 | 7 |
| 4 | 12 | 12 | 7 |
| 5 |  |  | 7 |
| . |  |  |  |
| . |  |  |  |
| 19 | 0 | 1 | 7 |
| 20 | 0 | 0 | 7 |
| Total Responder Count | 140 | 140 | 140 |

Model 1 has lift values of 5.14 (=36/7) in the first bin, 4.29 (=30/7) in the $2^{nd}$ bin, and so on. Model 2 has lift values of 4.57 (=32/7) in the first bin, 3.86 (=27/7) in the $2^{nd}$ bin, and so on.

A model lift chart is created using bin #'s in the X-axis and lift values in the Y-axis. There is one curve for each model in the lift chart. One may conclude that model 1 is better than model 2 since model 1 has better lift values in the first few bins. As shown by the above, using a test partition is helpful. Otherwise an over-fitted model can excel at predicting training partition, but fail miserably at predicting test partition.

The following is another example of the many different types of operational scenarios within which a model manager can be used. As mentioned above, organizations today rely more on analytics to accurately predict and forecast their business outcomes and to improve their business performance through optimization. However, as the number of these models increases to support more and more business objectives, so does the requirement to manage these models reliably and securely as valuable corporate assets. The following provides an illustration of this within a commodities (e.g., coffee, etc.) analysis context. In this hypothetical example and based upon initial analytics, commodities have been determined as trending upwards with the exception of gourmet coffee. In order to discern any problems with its sale of gourmet coffee, a commodities company wants to know if the gourmet coffee loyalty card promotion started last year is still performing well. Model analysis provides that based on the down trend in coffee prices, profit margins on this campaign have been doing very well, and response rates among loyalty card holders overall are high. A champion prediction model has been deployed that is able to segment the company's customer base for improved contact management strategies. However, recently, a model manager provided an alert notification indicating that the champion prediction model used to score prospects is beginning to degrade.

In this example, the alert notification process of the model manager includes a set of monitoring reporting processes that generated performance metrics as the model is being scored over time. When the model performance exceeds predefined thresholds, an alert notification is sent out via email and to the corporation's intranet (e.g., the model staleness alert notification 1900 of FIG. 20). Based upon this detection, the model manager determines whether to place into production a new champion model that is being developed for this company's quarter promotion.

Figure 21A:
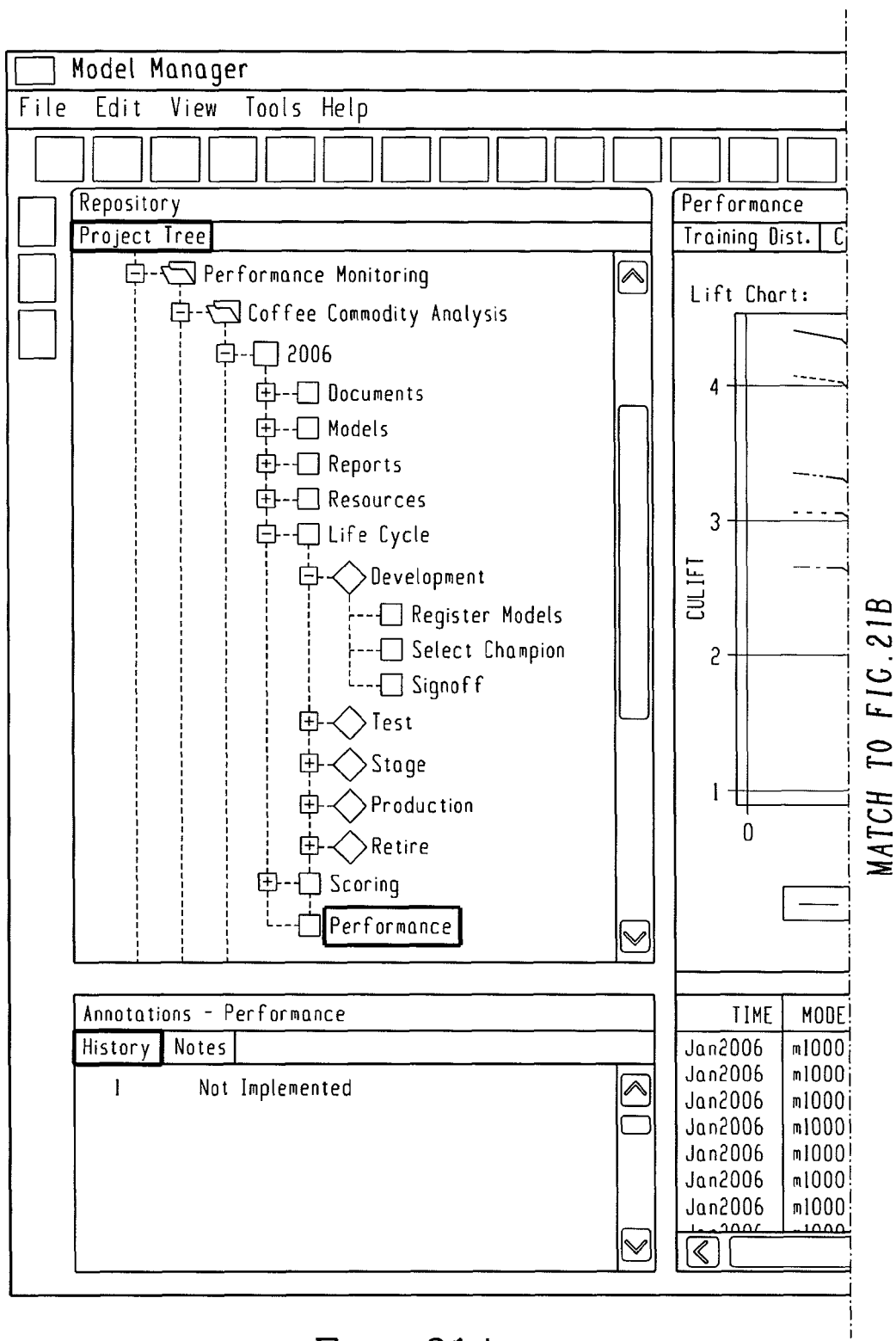
FIGS. 21A-21B provide an illustration of characteristic and stability charts showing variable inputs and output drift.
Figure 21B:
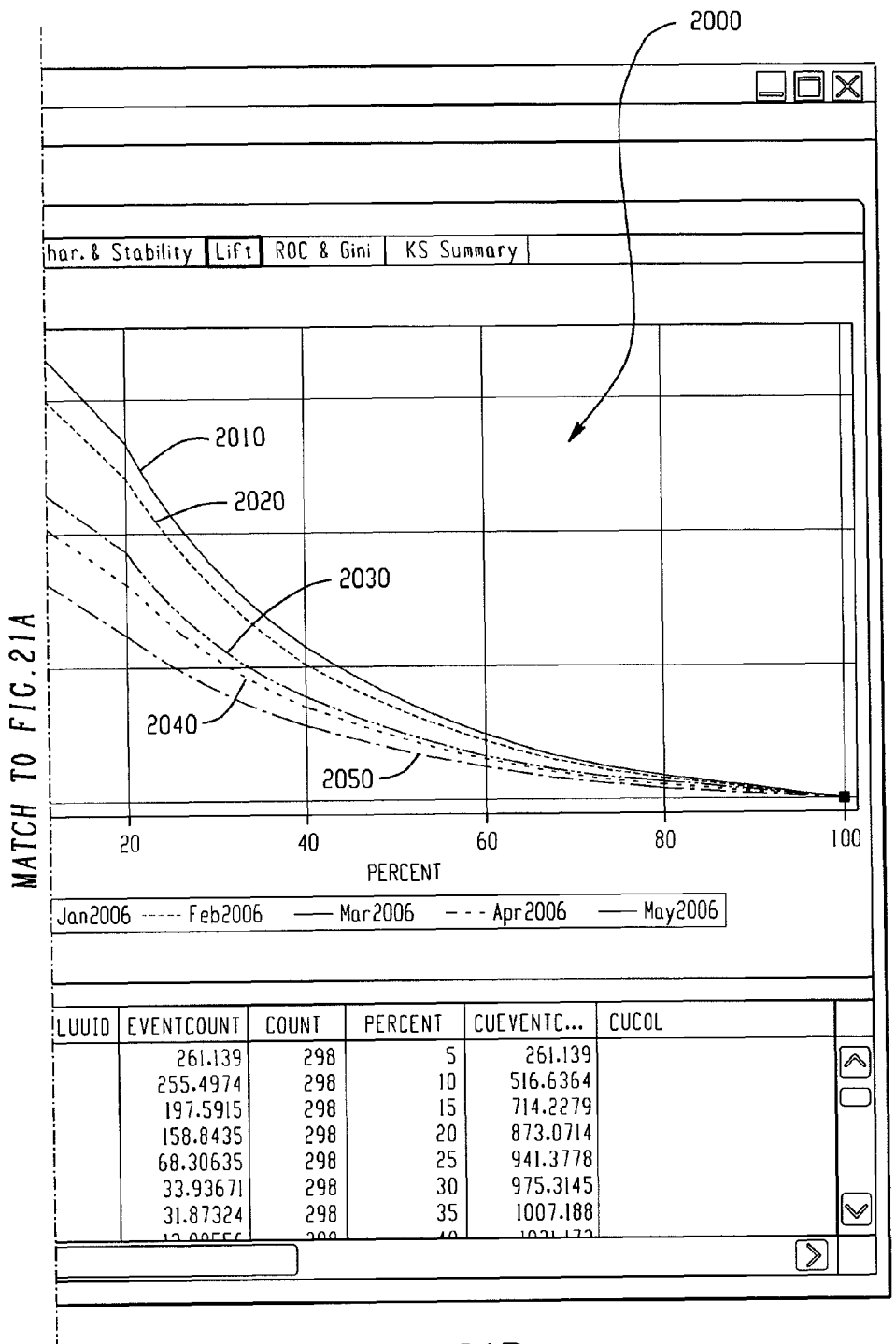

In the coffee commodity performance analysis, the monitoring reporting processes uses a model lift evaluation in its performance reports. In this gourmet coffee example, the model lift (which is a measure of how well the model is capturing buyers of gourmet coffee) has dropped off from about 1.6 when the model was initially developed to about 1.3 for the last quarter. As depicted at 2000 in FIGS. 21A-21B, the lift chart shows that the variable inputs and the output for the model respectively are drifting further, thereby indicating a need for a new model: January 2006 is shown at 2010; February 2006 is shown at 2020; March 2006 is shown at 2030; April 2006 is shown at 2040; and May 2006 is shown at 2050.

In this gourmet coffee example, a model manager includes a secure, centralized repository for storing and organizing models based on the company's business objectives. The company's models are organized within the repository by various company campaigns. As an illustration, the model manager (MM) "Gourmet Coffee" project contains champion and challenger models, along with extensive metadata, scoring code, data sources and supporting documentation.

A model manager can support a wide range of analytical models, such as prediction classification, segmentation, and rules base models and can be developed using such tools as SAS Enterprise Miner™ (EM), SAS/STAT, and base SAS. For example, a challenger model can be a decision tree model that outperforms the current champion model, and thus is the new champion model. The champion model can be shown with the metadata about the model, the scoring code, etc. A scoring officer can use all of this information to deploy the model back into operations.

A model manager can assist with respect to model governance policies, such as by providing a lifecycle template for each version which enables the company to keep track of where the model is in the development, validate, deploy, and retire lifecycle. A model manager can also provide event logging for auditing purposes which enables the scoring officers to version control the scoring code.

The models can be placed in production as follows. As brief background, scoring is the process of applying the model to target new customers and can be done in batch or on demand. For the company's catalog mailing response campaigns, the model manager scores prospects in batch and then rank orders the customers for the mailing. On demand scoring is used for making offers on the company's website and at the call center.

In this example, the coffee campaign is being run exclusively on the company's web channel. Thus, when someone makes an order on the web site the model manger dynamically generates an offer using pre-computed scores. If the site visitor is not one of the company's loyalty card holders, then the system recommends the company's top two sellers along with gourmet coffee. This is a market-basket business rule.

For those loyalty card holders who are predicted by the model to be high value customers, the system first performs a table lookup to see if gourmet coffee has ever been offered.

This is helpful in managing the contact strategies for the company's high value customers. If gourmet coffee has never been offered, the company sends out a coffee maker along with a sample of coffee with their order. Otherwise another high value customer promotion is offered. If the loyalty card holder is a low value customer then a 20% discount for gourmet coffee is offered. As long as commodity prices for coffee stay low, the company can continue to make good money on this web campaign.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an example, it should be understood that in the processing flows described herein, the steps and the order of the steps may be altered, modified, removed and/or augmented and still achieve the desired outcome. A multiprocessing or multitasking environment could allow two or more steps to be executed concurrently.

Figure 22:
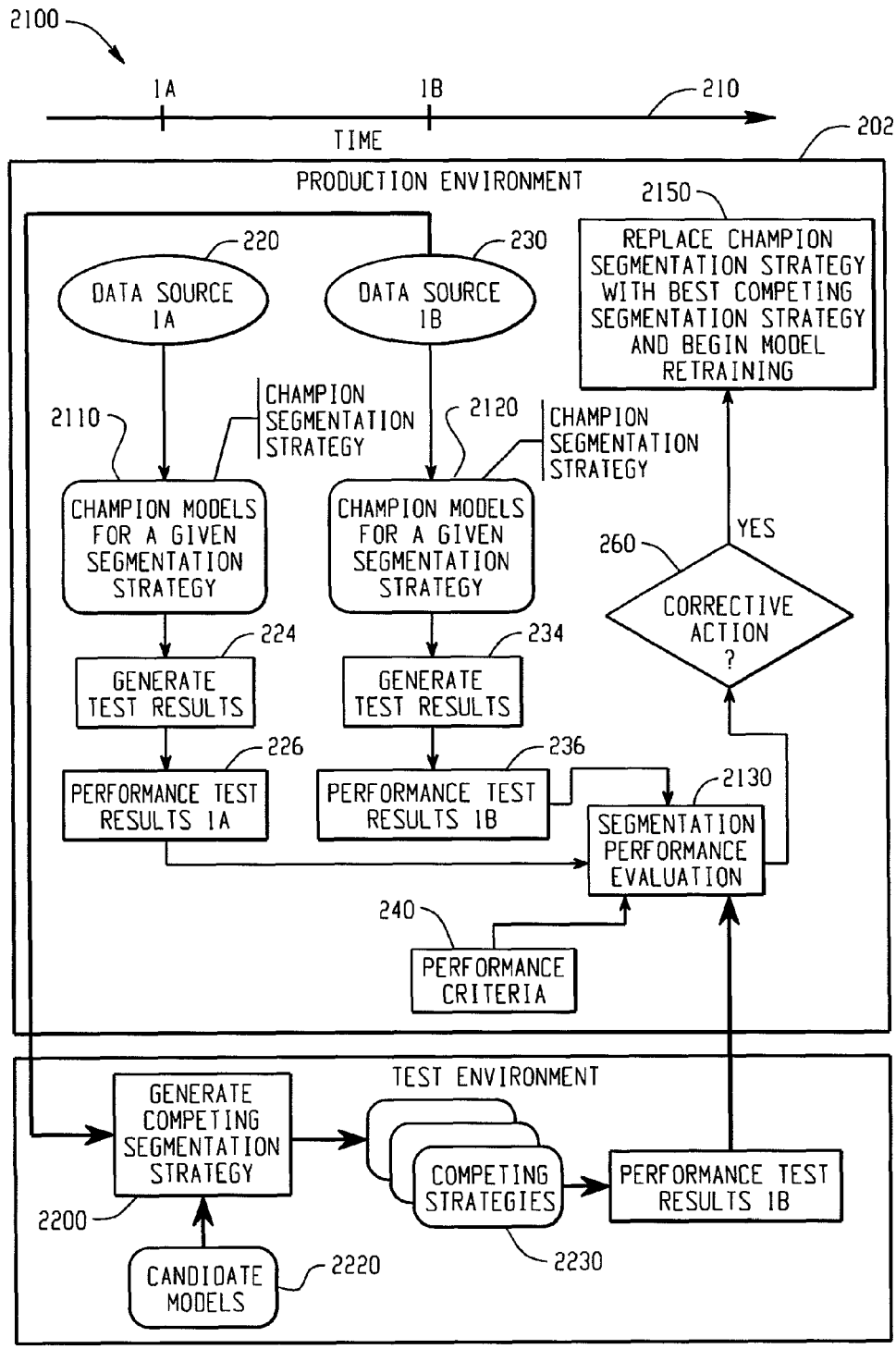
FIG. 22 is a block diagram depicting champion models in a production environment that have been developed for a given segmentation strategy.

As another example of the wide scope of the systems and methods disclosed herein, FIG. 22 depicts champion models (2110 and 2120) in a production environment that have been developed for a given segmentation strategy. In other words, a deployed champion model provides predictions for a given segment within the segmentation strategy that is currently being used within the production environment (i.e., the champion segmentation strategy). Segmentation strategy and computer-implemented systems to implement segmentation strategies are disclosed in the following co-pending patent application: "System and Method for Assessing Segmentation Strategies" (filed Mar. 22, 2006 with Ser. No. 11/386,918) of which the entire disclosure (including any and all figures) is incorporated herein by reference.

The production environment can be configured to evaluate whether the champion segmentation strategy can be improved upon by a competing segmentation strategy. If a new segmentation strategy has been shown to be an improvement upon the current champion segmentation strategy, then the improved segmentation strategy is used to re-train the models associated with the new segmentation strategy.

The test environment can evaluate each champion model's performance degradation independently of the performance degradation evaluation of other champion models. Accordingly, the testing can be performed piecewise to determine whether a particular segment can be improved upon without requiring the evaluation of other segments of the segmentation strategy. Alternatively, multiple or all segments of a segmentation strategy can be evaluated at about the same time.

As an operational scenario example, at a point in time (e.g., time 1B), the test environment generates at 2200 competing segmentation strategy(ies) 2230 through an automated segmentation process. In the example of FIG. 22, the automated segmentation process 2200 devises multiple segmentation strategies 2230 to predict the segments associated with data source 1B. Each of the competing segmentation strategies 2230 includes a plurality of segments. As described in the patent application entitled "System and Method for Assessing Segmentation Strategies," a technique for defining a segmentation strategy includes the identification of classification variables of a population. The classification variables may be financial, demographic, geographic, behavioral, or other variables that may be used to classify a population. The classification variables are used to group the population into segments so that the segments may be dealt with rather than dealing with individuals of the population.

Process 2200 then selects a model from a plurality of candidate models 2220 for each segment of each segmentation strategy. A variety of models may be used for candidate models 2220, including CHAID, CART, multivariate analysis regression, neural networks, and the like.

The segmentation performance evaluation process 2130 measures segment performance by comparing the champion segment strategy's performance with the competing segment strategies' performance. If one of the competing segmentation strategies 2230 has been shown to be an improvement upon the current champion segmentation strategy, then the improved segmentation strategy is used at 2150 to re-train the models associated with the new segmentation strategy.

As yet another example of the wide scope of the systems and methods disclosed herein, the models can be stored, managed and accessed in many different ways, such as through use of a centralized model repository system. Model repository approaches are described in the commonly assigned U.S. Pat. No. 6,920,458, which is herein incorporated by reference. Therein, a model repository is disclosed for storing selected data models generated by a data mining application. The model repository is a structure that may be organized into a plurality of levels, including a project level, a diagram level, and a model level. The project level may include one or more diagrams, each of which describes a particular set of model specifications. Each diagram may then be associated with one or more models. Associated with the model repository is a model repository facility that is preferably integrated into the data mining application and enables operations, such as the exportation of useful models to the model repository. The model repository may also include one or more index data structures for storing attributes of the models within the model repository. These indexes may include a main index that contains attributes of all the models stored in the model repository, and one or more special indexes, such as a tree-type index and mini-index, that contain the attributes of a particular sub-set of the models stored in the model repository. A user may then search through the one or more indexes in order to find a model that suits his or her needs. Alternatively, a user application program may programmatically query the model repository in order to find and extract information from a particular model stored in the model repository.

Another model repository approach is disclosed in the commonly assigned U.S. Pat. No. 7,039,622, which is also herein incorporated by reference. Therein, a computer-implemented knowledge repository data interface system and method are used by client applications to interact with a plurality of knowledge repositories. The knowledge repositories contain analytical models of interest to the client applications. A request handling module receives requests regarding the models from one of the client applications over a network. Knowledge repository application programming interfaces (APIs) are used to retrieve data about the models in the knowledge repositories based upon the received requests.

Model repositories may also be used in publishing and creating monitoring reports as described, for example, in Appendix E of the following document: U.S. application Ser. No. 60/981,907, (entitled "Computer-Implemented Systems And Methods For Updating Predictive Models" and filed on Oct. 23, 2007), of which the entire disclosure (including any and all figures) is incorporated herein by reference. As described therein, a model manager can use the model manager and model repository framework to publish model version updates to the operational testing or production scoring servers. Model manager model monitoring reports provide a means to monitor and evaluate model performance. Degrading model performance may indicate a need to tune or refit the model, or a need to seek a new champion model.

It is further noted that the systems and methods may be implemented on various types of computer architectures, such as for example on a single general purpose computer or workstation, or on a networked system, or in a client-server configuration, or in an application service provider configuration.

The systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of assessing a predictive model, comprising:
    accessing, using one or more data processors, a predictive model for scoring transactional data and data associated with a time period;
    generating, using the one or more data processors, one or more predictions using the predictive model and the data;
    calculating, using the one or more data processors, a baseline performance metric for the predictive model based upon the predictions;
    accessing, using the one or more data processors, new data associated with a new time period that is later than the time period;
    generating, using the one or more data processors, one or more new data predictions using the predictive model and the new data;
    calculating, using the one or more data processors, an updated performance metric for the predictive model based upon the new data predictions;
    comparing, using the one or more data processors, the baseline performance metric and the updated performance metric to determine an indication of predictive ability decay for the predictive model; and
    performing, using the one or more data processors, a corrective action for the predictive model when the indication of predictive ability decay reaches a threshold.

2. The method of claim 1, wherein the predictive model is operating within a production environment, wherein performance of an additional predictive model in the production environment is assessed, and wherein a second corrective action is performed on the additional predictive model when predictive ability decay of the additional predictive model reaches the threshold.

3. The method of claim 1, wherein the predictive model generates predictions for fraud detection, rate making, credit scoring, customer retention, customer lifetime value, customer attrition or churn, or marketing response.

4. The method of claim 1, wherein the predictive ability decay is caused by evolution of a customer base or changes in predictability of data used by the predictive model.

5. The method of claim 1, wherein the corrective action is performed by one or more servers or a single general purpose computer.

6. The method of claim 1, wherein the predictive model is a neural network model, a logistic model, or a decision tree model.

7. The method of claim 1, wherein the corrective action includes providing a warning via a graphical interface.

8. The method of claim 7, further comprising:
    performing a second corrective action for the predictive model when the indication of the predictive ability decay reaches a second threshold, wherein the second corrective action includes issuing an alert via the graphical interface.

9. The method of claim 8, wherein the threshold is indicative of less severe predictive decay than the second threshold.

10. The method of claim 1, wherein comparing further includes identifying a change in an input or output variable distribution, and wherein the identified change is greater than a distribution change threshold.

11. The method of claim 1, wherein the corrective action includes building a replacement predictive model.

12. The method of claim 11, wherein the replacement predictive model is automatically recalibrated using the new data.

13. The method of claim 1, wherein the corrective action includes sending a notification to pre-selected parties.

14. The method of claim 1, further comprising:
logging the baseline performance metric and the updated performance metric in a data store.

15. The method of claim 14, further comprising:
providing monitoring reports showing trends in model performance.

16. The method of claim 1, wherein the predictive model is retrieved from a centralized model repository.

17. The method of claim 1, wherein the indication of predictive ability decay is calculated according to a Lift5decay, wherein the Lift5decay identifies a lift performance decay based upon top 5% of the data and the new data, wherein the Lift5decay is calculated according to:

$$\text{Lift5decay} = (\text{Lift5}_B - \text{Lift5}_A)/\text{Lift5}_A,$$

where $\text{Lift5}_A$ is the lift value of the predictions of the predictive model for the top 5% based on the data, where $\text{Lift5}_B$ is the lift value of the new predictions of the predictive model for the top 5% based on the new data.

18. The method of claim 1, wherein the indication of predictive ability decay is calculated according to a Lift10decay, wherein the Lift10decay identifies a lift performance decay based on a top 10% of the data and the new data, wherein the Lift10decay is calculated according to:

$$\text{Lift10decay} = (\text{Lift10}_B - \text{Lift10}_A)/\text{Lift10}_A,$$

where $\text{Lift10}_A$ is the lift value of the predictions of the predictive model for the top 10% based on the data, where $\text{Lift10}_B$ is the lift value of the new predictions of the predictive model for the top 10% based on the new data.

19. The method of claim 1, wherein the indication of predictive ability decay is calculated according to a GiniDecay, wherein the GiniDecay identifies a decline in an area under a receiver operating curve, wherein the GiniDecay is calculated according to:

$$\text{GiniDecay} = (\text{GiniIndex}_B - \text{GiniIndex}_A)/\text{GiniIndex}_A,$$

where $\text{GiniIndex}_A$ is the area under the receiver operating curve for the predictions of the predictive model based on the data, where $\text{GiniIndex}_B$ is the area under the receiver operating curve for the new predictions of the predictive model based on the new data.

20. The method of claim 1, wherein the indication of predictive ability decay is calculated according to a KSDecay, wherein the KSDecay identifies a decline in a maximum vertical distance between two curves of a Kolmogorov-Smirnov chart, wherein the KSDecay is calculated according to:

$$\text{KSDecay} = (\text{KSStatistic}_B - \text{KSStatistic}_A)/\text{KSStatistic}_A,$$

where $\text{KSStatistic}_A$ is the vertical distance between the two curves for the predictions of the predictive model based on the data, where $\text{KSStatistic}_B$ is the vertical distance between the two curves for the new predictions of the predictive model based on the new data.

21. The method of claim 17, wherein the data and the new data include actual values.

22. A system for assessing a predictive model, comprising:
one or more data processors;
one or more computer-readable storage mediums containing instructions configured to cause the one or more processors to perform operations including:
accessing a predictive model for scoring transactional data and data associated with a time period;
generating one or more predictions using the predictive model and the data;
calculating a baseline performance metric for the predictive model based upon the predictions;
accessing new data associated with a new time period that is later than the time period;
generating one or more new data predictions using the predictive model and the new data;
calculating an updated performance metric for the predictive model based upon the new data predictions;
comparing the baseline performance metric and the updated performance metric to determine an indication of predictive ability decay for the predictive model; and
performing a corrective action for the predictive model when the indication of predictive ability decay reaches a threshold.

23. A computer-program product for assessing a predictive model, tangibly embodied in a machine-readable storage medium, including instructions configured to cause a data processing apparatus to:
access a predictive model for scoring transactional data and data associated with a time period;
generate one or more predictions using the predictive model and the data;
calculate a baseline performance metric for the predictive model based upon the predictions;
access new data associated with a new time period that is later than the time period;
generate one or more new data predictions using the predictive model and the new data;
calculate an updated performance metric for the predictive model based upon the new data predictions;
compare the baseline performance metric and the updated performance metric to determine an indication of predictive ability decay for the predictive model; and
perform a corrective action for the predictive model when the indication of predictive ability decay reaches a threshold.

* * * * *